US009500069B2

(12) United States Patent
Ersoz et al.

(10) Patent No.: US 9,500,069 B2
(45) Date of Patent: Nov. 22, 2016

(54) METHOD AND APPARATUS FOR GENERATING SEISMIC PULSES TO MAP SUBTERRANEAN FRACTURES

(71) Applicant: Halliburton Energy Services, Inc., Houston, TX (US)

(72) Inventors: Haluk Vefa Ersoz, Woodlands, TX (US); Lee J. Hall, Woodlands, TX (US); David Loveless, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 24 days.

(21) Appl. No.: 14/306,993

(22) Filed: Jun. 17, 2014

(65) Prior Publication Data

US 2014/0338905 A1 Nov. 20, 2014

Related U.S. Application Data

(63) Continuation of application No. 14/366,144, filed as application No. PCT/US2013/041577 on May 17, 2013.

(51) Int. Cl.
*E21B 47/00* (2012.01)
*E21B 43/26* (2006.01)

(52) U.S. Cl.
CPC .............. *E21B 47/00* (2013.01); *E21B 43/26* (2013.01)

(58) Field of Classification Search
CPC ...... E21B 47/00; E21B 43/267; E21B 49/00; E21B 43/263; E21B 47/1015; E21B 47/12; E21B 43/26; G01V 1/288; G01V 2210/646; G01V 1/02; G01V 2210/1234; G01V 1/40; C09K 8/80; C09K 8/805
See application file for complete search history.

(56) References Cited

U.S. PATENT DOCUMENTS

| 8,939,205 B2 | 1/2015 | Ersoz |
| 2002/0035918 A1 | 3/2002 | Jung |
| 2004/0226715 A1 | 11/2004 | Willberg et al. |

(Continued)

FOREIGN PATENT DOCUMENTS

| WO | 2012094134 A1 | 7/2012 |
| WO | 2013154537 A1 | 10/2013 |

(Continued)

OTHER PUBLICATIONS

International Search Report and Written Opinion dated Feb. 6, 2014 for Application No. PCT/US2013/041577.

(Continued)

*Primary Examiner* — Zakiya W Bates
(74) *Attorney, Agent, or Firm* — Craig W. Roddy; Baker Botts L.L.P.

(57) ABSTRACT

Methods for determining distribution, orientation and dimensions of networks of hydraulically-induced fractures within a subterranean formation containing fluids. Microseismic events are generated by particles introduced into the fractures which are capable of explosive or chemical reaction. In one method, treated proppant having a reactive coating is positioned in the formation during fracturing and reactive particles are introduced. In another method, reactive particles having a reactive core and a non-reactive coating are positioned in the fractures and react upon removal of the non-reactive coating, such as by dissolving, and reaction with a reactive particle. The waves generated by the microseismic events are used to map fracture space.

9 Claims, 18 Drawing Sheets

(56) References Cited

U.S. PATENT DOCUMENTS

| | | |
|---|---|---|
| 2008/0149329 A1 | 6/2008 | Cooper et al. |
| 2009/0250216 A1 | 10/2009 | Bicerano |
| 2009/0288820 A1* | 11/2009 | Barron .................... B01J 13/02 166/249 |
| 2012/0132418 A1 | 5/2012 | McClung, III |
| 2012/0138295 A1 | 6/2012 | Novotny |
| 2012/0152529 A1 | 6/2012 | Eick et al. |
| 2012/0168152 A1 | 7/2012 | Casciaro |
| 2012/0181020 A1 | 7/2012 | Barron et al. |
| 2012/0247765 A1 | 10/2012 | Agrawal et al. |
| 2012/0273192 A1 | 11/2012 | Schmidt et al. |
| 2014/0216730 A1 | 8/2014 | Ersoz |
| 2014/0284049 A1 | 9/2014 | DiFoggio et al. |
| 2014/0338905 A1 | 11/2014 | Ersoz et al. |
| 2015/0107830 A1 | 4/2015 | Ersoz et al. |
| 2015/0118454 A1 | 4/2015 | Kwon et al. |
| 2015/0248604 A1 | 9/2015 | Diorio et al. |
| 2015/0354337 A1 | 12/2015 | Ersoz et al. |

FOREIGN PATENT DOCUMENTS

| | | |
|---|---|---|
| WO | 2014185929 A1 | 11/2014 |
| WO | 2015026319 A1 | 2/2015 |
| WO | 2015026331 A1 | 2/2015 |

OTHER PUBLICATIONS

International Preliminary Report on Patentability issued in related PCT Application No. PCT/US2013/041577 mailed Nov. 26, 2015 (8 pages).

Aldridge, David F., "Radiation of Elastic Waves from Point Sources in a Uniform Wholespace" Sandia National Labs., Jul. 2000 (73 pages).

Warpinski et al., "Autonomous Microexplosives Subsurface Tracing System Final Report" Sandia National Labs., Apr. 2004 (70 pages).

International Search Report and Written Opinion issued in related PCT Application No. PCT/US2013/043605, mailed Feb. 21, 2014 (9 pages).

International Preliminary Report on Patentability issued in related PCT Application No. PCT/US2013/043605 mailed Dec. 10, 2015 (8 pages).

* cited by examiner

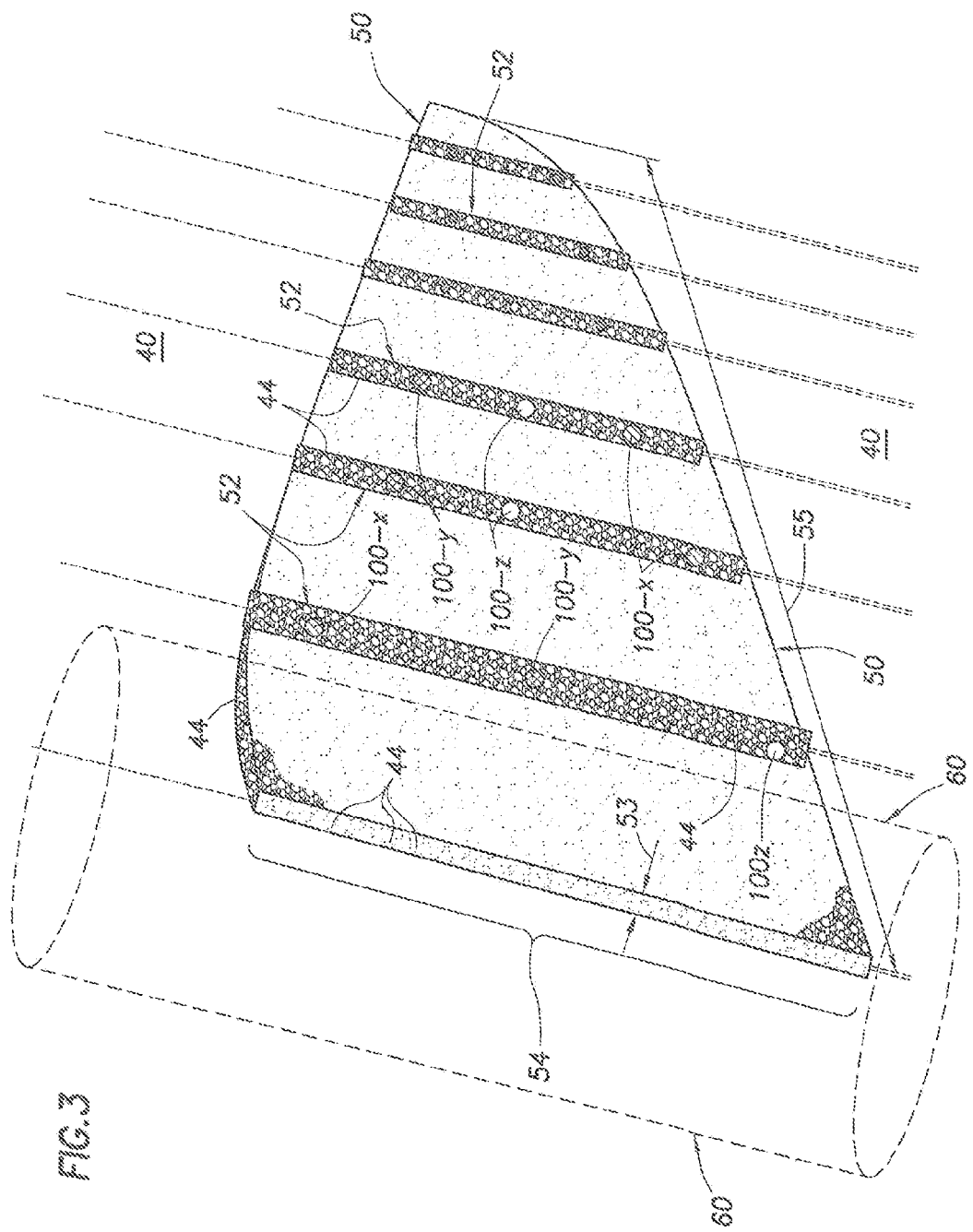

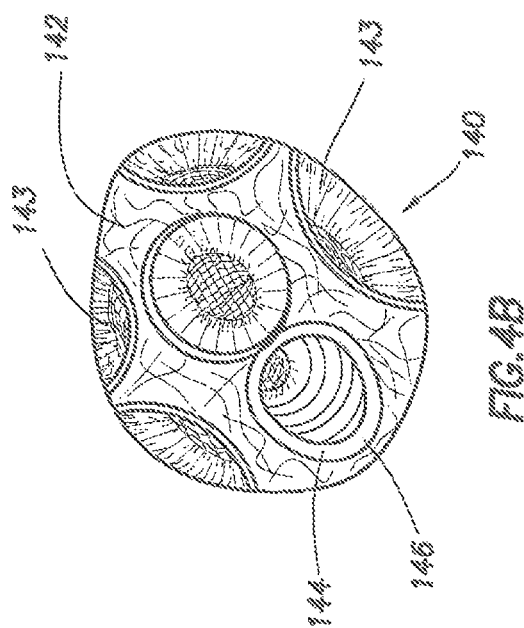
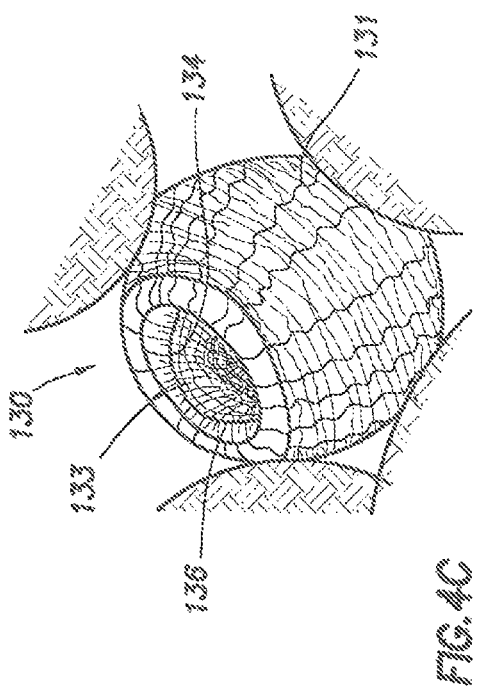
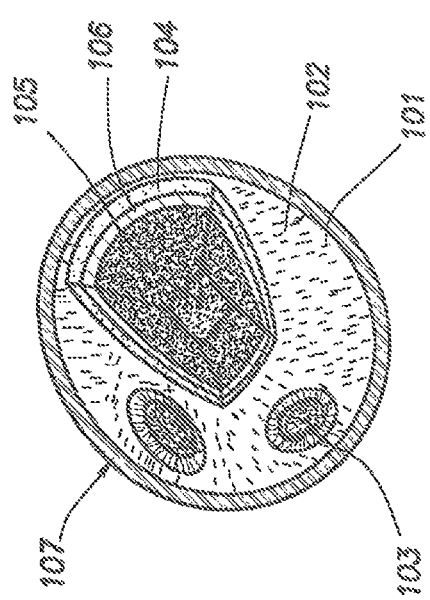

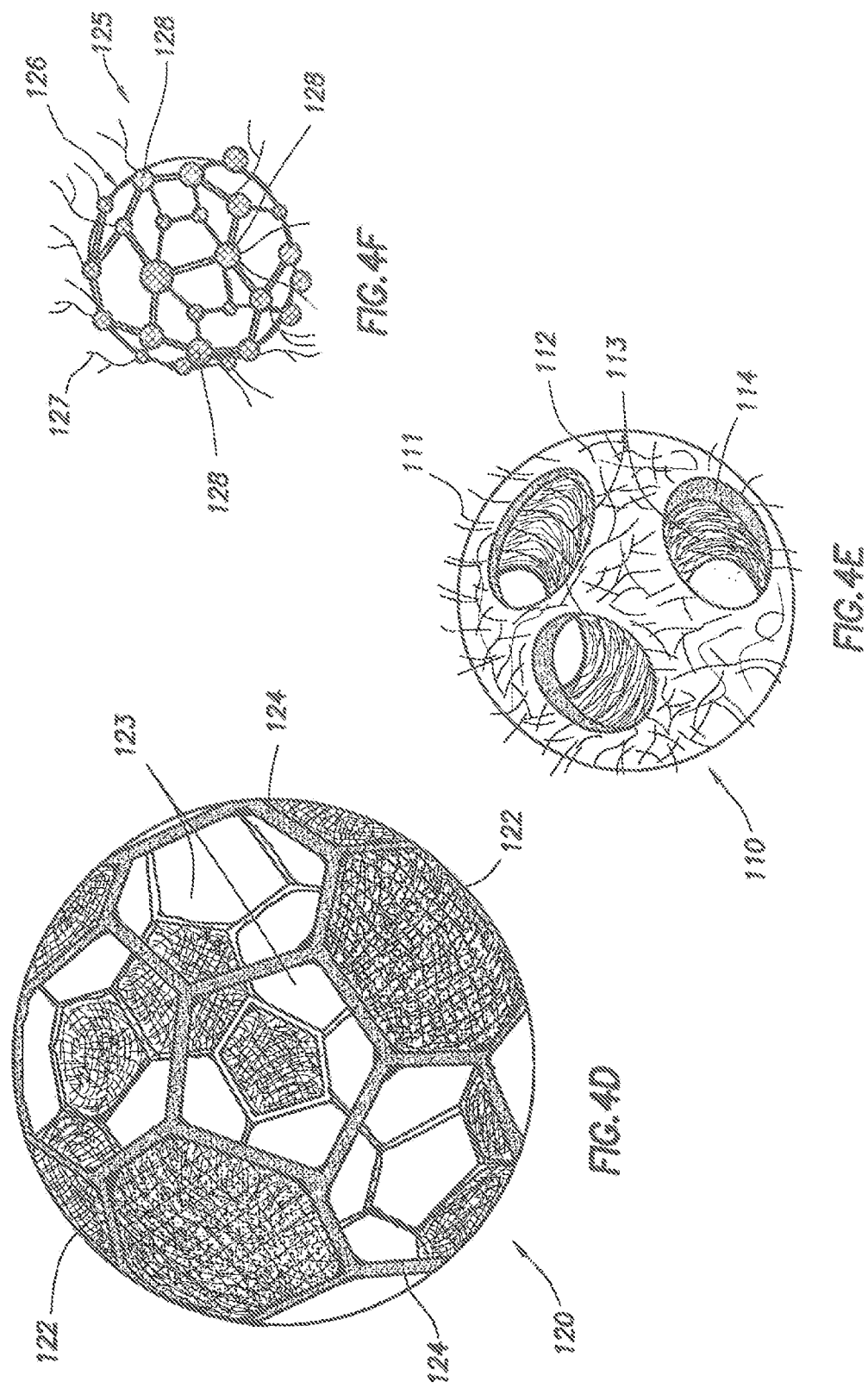

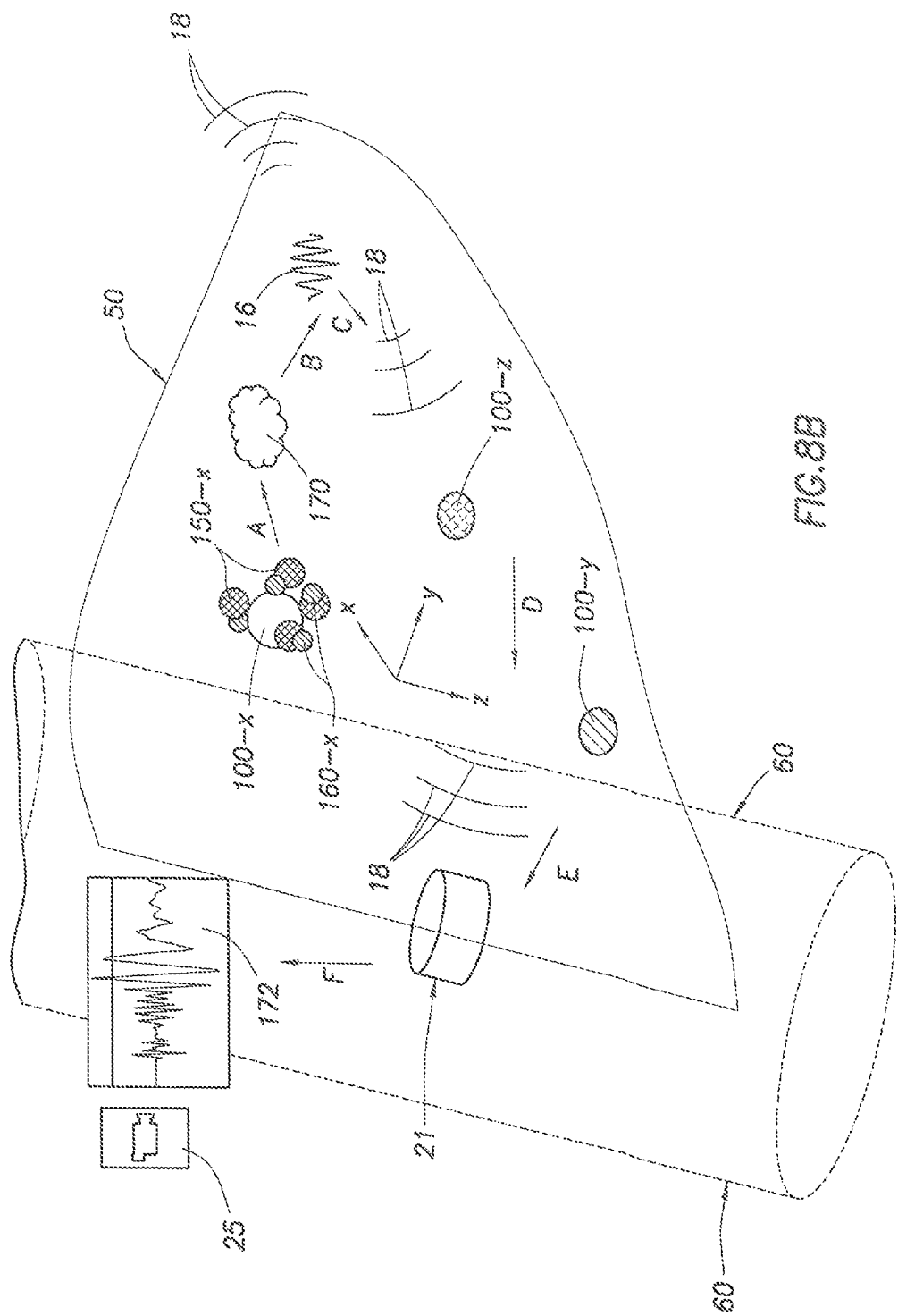

METHOD AND APPARATUS FOR GENERATING SEISMIC PULSES TO MAP SUBTERRANEAN FRACTURES

CROSS-REFERENCE TO RELATED APPLICATION

The present application is a U.S. National Stage Application of International Application No. PCT/US2013/41577, filed May 17, 2013, which is incorporated herein by reference in its entirety for all purposes.

FIELD OF INVENTION

The invention relates, in general, to accurately determining the distribution, dimension and geometry of hydraulically-induced fractures and fracture networks, i.e., "mapping," in a subterranean reservoir. More particularly, the invention relates to methods and apparatus for creating micro-seismic events at a plurality of locations within the fractures and fracture networks.

BACKGROUND OF INVENTION

Hydraulic fracturing is used to improve well productivity by hydraulically injecting fluid under pressure into a selected zone of a reservoir. The pressure causes the formation and/or enlargement of fractures in this zone. Proppant is typically positioned in the fractures with the injected fluids before pumping is halted to prevent total closure. The proppant thus holds the fractures open, creating a permeable and porous path, open to fluid flow from the reservoir formation to the wellbore. Recoverable fluids, such as, oil, gas or water are then pumped or flowed to the surface.

The information on the geometry of the generated hydraulic fracture networks in a given reservoir formation is critical in determining the design parameters of future fracture treatments (such as types and amounts of proppant or fluids to use), further well treatments to be employed, for the design of the future wells to be drilled, for managing production, etc. Therefore, there is a need for accurate mapping of the fractures. The methods typically used include pressure and temperature analysis, seismic sensor (e.g., tilt-meter) observational analysis, and micro-seismic monitoring of fracture formation during fracturing processes. Each of these methods have their drawbacks, including complicated de-convolution of acquired data, reliance on assumed parameters, educated "guesswork" as to the connectivity of various mapped seismic events, and problems associated with reliance on mapping-while-fracturing methods, namely, measuring the shape of the fractures during formation (rather than after closure or during production), measuring fractures which may not be conductive to the wellbore, acoustic "noise" from the fracturing procedures, and an inability to distinguish between seismic events that are caused by fracture formation or other processes.

Methods have been suggested for mapping fractures using explosive, implosive or rapidly combustible particulate material added to the fracturing fluid and pumped into the fracture during the stimulation treatment, namely, in U.S. Pat. No. 7,134,492 to Willberg, et al., which is incorporated herein by reference for all purposes. Similar methods are disclosed in *Autonomous Microexplosives Subsurface Tracing System Final Report*, Sandia Report (SAND2004-1415), Warpinski, N. R., Engler, B. P., et al., (2004), incorporated herein by reference for all purposes. However, the suggested practices have significant drawbacks, including the transport and handling of explosive particles at the surface and during pumping, exposure of explosive particles to very high pressures, treatment and wellbore fluids and chemistry, difficulty in controlling the timing of the explosions given their lengthy exposure to fracturing fluids, exposure of particles to significant and high pressures during fracturing, the risk of explosive particles becoming stuck in the well completion string, pumping and mixing equipment, etc. Further, some of the proposals require the inclusion of power sources, electronics, etc., in the injected particles which may be impractical at the sizes required to infiltrate a fracture and proppant and are relatively expensive.

It is therefore an object of the present invention to provide a new approach to evaluating hydraulic fracture geometry.

SUMMARY OF THE INVENTION

A number of specially designed particles with specific functionalities are released into the fracture space during the treatment, subsequent to the treatment during closure, or after the treatment. An energetic chemical reaction between particles causes micro-seismic events which generate acoustic waves from within the fracture space. These seismic events travel through the formation to be detected by seismic sensors positioned at the surface, in local observation wells, or in the wellbore from which the particles are released.

Each of methods described herein are based on generation of detectable seismic events, acoustic pulses, by particles capable of explosive or rapid chemical reaction positioned within the fracture space. In one embodiment, the micro-seismic events occur after fracture pumping is completed and the fracture network is established.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3 is an exemplary embodiment of Attachment Site particles of different species of particles in a propped fracture space according to one aspect of the invention;

FIGS. 4A-F are graphical representations of exemplary embodiments of Attachment Site architectures according to aspects of the invention;

FIG. 8B is a schematic representation of a method of attaching Attachment Site, Type-1 and Type-2 particles in a simple fracture and producing micro-seismic events according to an aspect of the invention

It should be understood by those skilled in the art that the use of directional terms such as above, below, upper, lower, upward, downward and the like are used in relation to the illustrative embodiments as they are depicted in the figures. Where this is not the case and a term is being used to indicate a required orientation, the specification will make such clear. Upstream, uphole, downstream and downhole are used to indicate location or direction in relation to the surface, where upstream indicates relative position or movement towards the surface along the wellbore and downstream indicates relative position or movement further away from the surface along the wellbore, unless otherwise indicated.

Even though the methods herein are discussed in relation to a vertical well, it should be understood by those skilled in the art that the system of the present invention is equally well-suited for use in wells having other configurations including deviated wells, inclined wells, horizontal wells, multilateral wells and the like. Accordingly, use of directional terms such as "above", "below", "upper", "lower" and the like are used for convenience. Also, even though the discussion refers to a surface well operation, it should be understood by those skilled in the art that the apparatus and methods can also be employed in an offshore operation.

DETAILED DESCRIPTION OF PREFERRED EMBODIMENTS

While the making and using of various embodiments of the present invention are discussed in detail below, a practitioner of the art will appreciate that the present invention provides applicable inventive concepts which can be embodied in a variety of specific contexts. The specific embodiments discussed herein are illustrative of specific ways to make and use the invention and do not limit the scope of the present invention.

Further disclosure regarding micro-seismic event creation during or after fracturing of a formation, as well as detection of these events, mapping, and other processes discussed herein can be found in International Application No. PCT/US2012/32822, to Ersoz, filed Apr. 10, 2012, which is incorporated herein in its entirety for all purposes.

Figure 1:
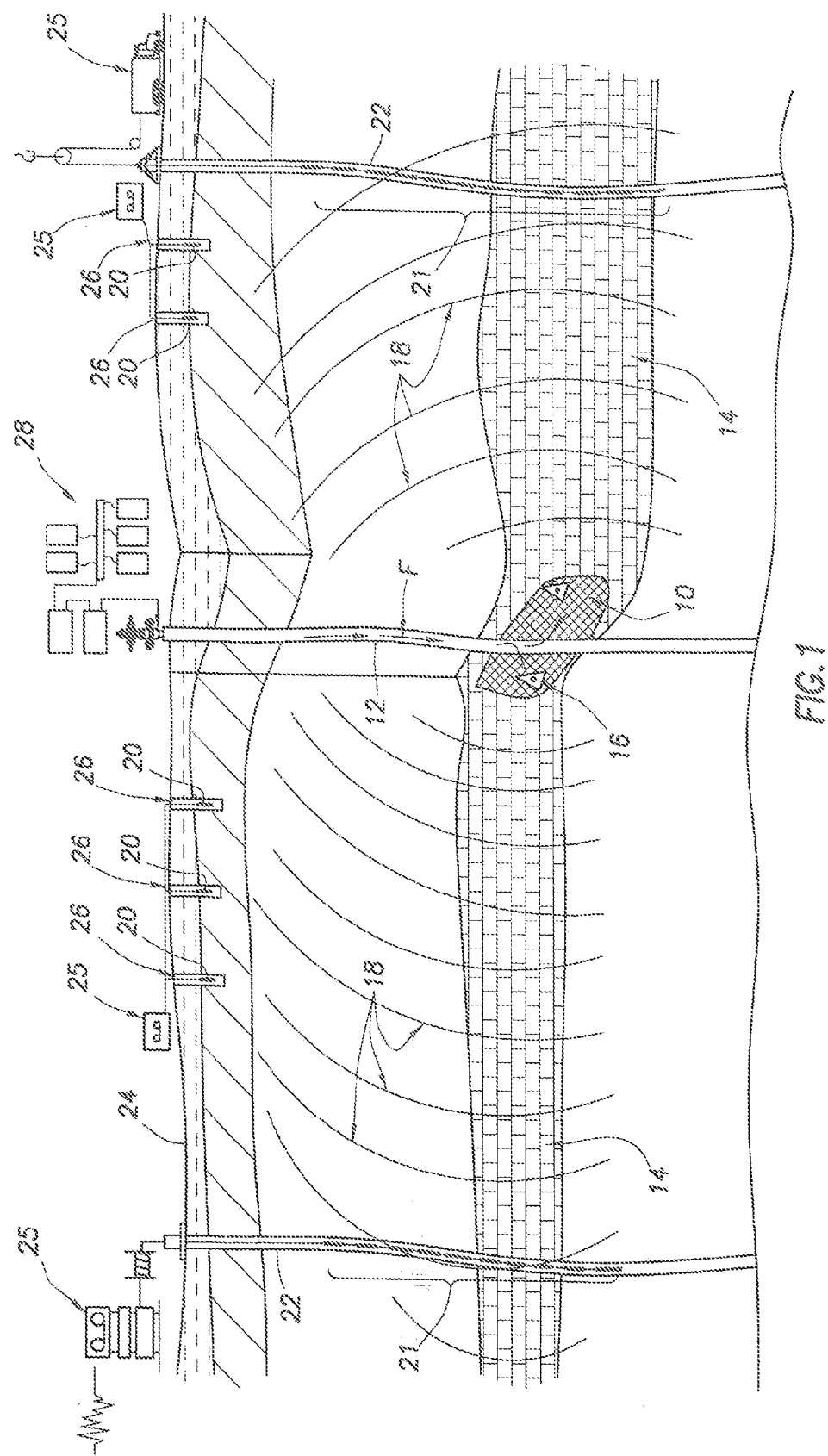
FIG. 1 is a schematic illustration of treatment and monitoring wells with arrayed sensors for detection and recording micro-seismic events caused during hydraulic fracturing.

FIG. 1 is a schematic illustration of a primary well and monitoring wells with sensors arrays for acquisition and recording of waves originating from the fracture space and traveling through the reservoir formations. In a typical drilling operation, several wellbores are used in a field to maximize production of hydrocarbons. Production of hydrocarbons can be enhanced by improving flow of fluids to the producing well using hydraulic fracturing techniques. The induced and pre-existing fractures create conductive pathways into the producing wells for fluids to flow to the well bore. Fractures formed by hydraulic fracturing methods may extend from the wellbore into the reservoir rock for as much as several hundred feet. As explained above, typically proppant materials are pumped into the fractures during formation to "prop" or maintain the fractures in an open, conductive state. Upon cessation of pumping, the opened or hydraulic fractures collapse or close for all practical purposes, leaving "propped fractures" open which are of smaller dimension. "Effective fractures," meaning the fractures providing production fluid conductivity to the wellbore, are typically of even smaller dimension.

An exemplary hydraulic fracture (10) is formed by pumping a fracturing fluid (F) into the treatment well (12) at a rate sufficient to increase downhole pressure to exceed the fracture gradient of the reservoir formation (14). The increased pressure causes the formation rock (14) to fracture, which allows the fracturing fluid (F) to enter and extend the fracture further into the formation (14). The fracturing of formation rock (14) and other events often related to expansion or relaxation of formation rock that change the in situ stress profile and pore pressure distribution create a plurality of micro-seismic events (16).

As used herein, the term "micro-seismic event" (and similar) refers to any event that causes a small but detectable change in stress and pressure distributions in a reservoir formation, including those caused by slippages, deformation, and breaking of rock along natural fractures, bedding or faults, creation of fractures or re-opening of fractures, and events artificially created by fracturing operations or caused by an explosion, implosion, exothermic reaction, etc.

Each micro-seismic event (16) generates seismic, or acoustic, waves (18). The waves generated may be of various types such as body waves, surface waves and others. For the purposes of this invention, the body waves are the main point of interest. There are two types of body waves: compression, pressure or primary waves (called P-waves), and shear or secondary waves (called S-waves). The P-waves and S-waves travel through the earth formations at speeds governed by the bulk density and bulk modulus (rock mechanical properties) of the formation. The rock mechanical properties of the formation vary according to mineralogy, porosity, fluid content, in situ stress profile and temperature.

The terms "seismic wave," "seismic pulse," "acoustic wave," "acoustic pulse" and similar, as used herein, refer to detectable and measurable P- and S-waves caused by the micro-seismic event. Each type of wave may be detected and measured by corresponding sensor equipment, generally referred to herein as "seismic sensors" or "acoustic sensors" or similar.

The waves (18) propagate away from each micro-seismic event (16) in all directions and travel through the reservoir formations. These waves are detected by a plurality of seismic sensors, such as seen at (20) and (21). These sensors (or receivers), which are capable of detecting and measuring micro-seismic events, can be of any type, such as seismographs, tilt meters, piezoelectric sensors, accelerometers, transducers, ground motion sensors, multi-axis sensors, geophones and/or hydrophones. Seismic sensors and sensor arrays are commercially available and known in the industry. The seismic sensors are sensitive instruments capable of detecting micro-seismic events (16). The seismic sensors can be placed in a wellbore of one or more observation or monitoring wells (22). Sensors can also be placed at or near the surface (24), preferably in shallow boreholes (26) drilled for that purpose. A typical shallow borehole (26) for such a purpose is ten to forty feet deep.

Micro-seismic monitoring is based on technologies with its origins rooted in earthquake seismology (that is, large amplitude events). More recently, with the development of extremely sensitive borehole sensor array systems and surface monitoring equipment, it has become possible to detect even very small amplitude events (micro-seismic events) that cause relatively small changes in stress and pressure distributions from considerable distances. In addition to the sensor technology, data acquisition, telemetry and processing systems have been developed to handle these small amplitude events. Consequently, micro-seismic events, which occur at much higher frequencies than surface seismic surveys, can be measured, even in the presence of "noise" caused by other surface and downhole activities.

The recorded P- and S-wave data is analyzed, in a process referred to as "mapping" "imaging," which calculates locations of the events in 3-dimensional reservoir space. Typically, a location information solution based on a statistical best-fit method is used to map an event in terms of distance, elevation and azimuth. Analysis of the recorded and measured seismic events will not be discussed herein in detail, as it is known in the art. Software for analyzing and displaying the measurements and results are commercially available. For example, such products and services are available from Halliburton Energy Services, Inc., under the brand names such as FracTrac® and TerraVista® visualization and interpretation. Further information, including on seismic event detection and analysis can be found in the following documents which are each incorporated herein by reference for all purposes: U.S. Pat. No. 7,908,230 to Bailey, U.S. Pat. No. 7,967,069 to Beasley, U.S. Pat. No. 7,874,362 to Coates, U.S. Pat. No. 7,830,745 to Suarez; and Patent Application Publication Nos. WO 2008/118986 to Coates, and 2007/105167 to Lafferty.

The accuracy of mapping recorded events is dependent on the number of sensors spaced across the reservoir and by the distance of the sensors from the measured events. It is beneficial, therefore, to place sensors in the treatment well. The current micro-seismic monitoring methods suffer from the fact that the entire process takes place during hydraulic fracturing. Therefore the recorded data include the "noise" of the fracturing process and the results (mapped event locations) are of opened fractures (rather than propped or effective fractures).

Currently, there is no way to accurately differentiate which events correspond to opened fractures, propped fractures and effective fractures. The methods described herein make it possible to map the effective (propped and connected) fracture space by separating the mapping survey from fracture formation process. Further, the methods described herein improve the quality and accuracy of the mapping process by allowing sensors to be placed in the treatment well and without interference from hydraulic fracturing "noise." Other improvements will be discussed in the following sections.

Sensors (20) and (21) detect and acquire P- and S-wave data that are generated by micro-seismic events (16) and traveled through the formations. The data is typically transferred to data processing systems (25) for preliminary well site analysis. In-depth analysis is typically performed after the raw data is collected and quality-checked. After final analysis, the results (maps of the fracture networks) are invaluable in development planning for the reservoir and field, and in designing future hydraulic fracturing jobs.

Figure 2:
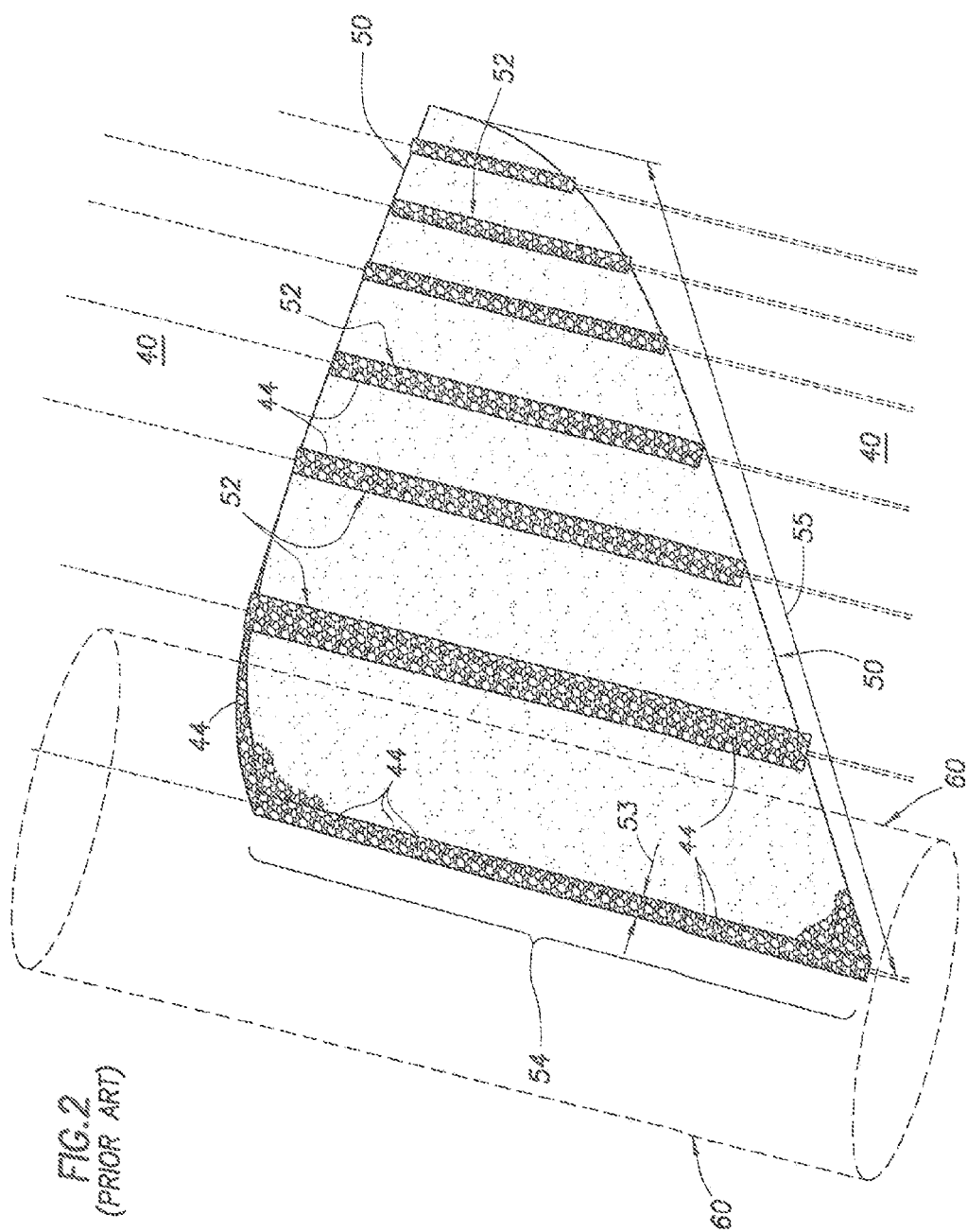
FIG. 2 is a schematic representation of a simple fracture model such as created and populated according to prior art processes.

FIG. 2 is a graphical representation of a simple fracture model. A simple bi-wing fracture plane (40) (only one wing shown) extends into a reservoir formation (14). A wellbore (60) (cased or uncased) is representative of the wellbore through which the fracturing fluid (F) is introduced into the zone, i.e. the "treatment well." The fracturing process results in formation of fractures which are initially propagated along planes, the orientation of which are dictated by the in situ stress profile of the formation (14). Typically, the planes radiate from the wellbore (60). Proppant particles (44) are pumped into the fractures along with the fracturing fluid. After pumping of the fluid (F) ceases, the fracture closes or seals to an effective fracture (50), indicated graphically in cross-sections (52). A typical fracture has a much greater length (55) than width (53) and can vary in height (54). These dimensions may become critical parameters for selecting size and amounts of proppant, particles and fluid injected into the formation, design of a fracturing plan, etc.

FIG. 3 is a graphical representation of propped fracture model and Attachment Site (AS) particles (100) that are preferably injected by pumping into the formation along with the proppant particles (44). As used herein, "injection" and related terms are used to include injection, pumping in fluids, and other methods of introducing fluids, slurries, gels, and solid-bearing fluids into a zone of a formation using methods known in the art. The term is used generically and includes, as will be indicated in the text, introduction of such fluids, etc., into the zone of the formation from a downhole tool positioned adjacent the zone (rather than pumped from the surface down the wellbore).

The methods presented herein use similar terminology to refer to similar types of particles, etc. The system will be described using the terms: Attachment Site (AS) particles (or Attachment Sites), Type-1 particles (T1), Type-2 particles (T2) and Type-3 particles (T3). Further, for each particle "type," a plurality of "species" can be employed, designated, for example, as AS-x, AS-y, AS-z, each suffix representing a different species of particle. The species of any one particle correspond to common species of the other particles. For example, AS-x particles will interact with T1-x and T2-x particles and not with T1-y and T2-y particles. Details are provided below.

First Method

Attachment Sites

FIGS. 4A-F are graphical representations of a number of embodiments of exemplary Attachment Site architectures. Attachment Site (100) particles are specially designed to act as "docking stations" for Type-1, -2 and -3 particles. Attachment Site particles do not contain explosives or reactive chemicals.

The AS particles have a functionalized surface layer or coating (102) which is selected and designed to allow attachment of pre-selected Type-1 and Type-2 particles. The process of attracting or attaching of the particles (AS, T1, T2, etc.) is primarily based on chemical and physical properties of the functionalized surface layer.

The Attachment Site particles (100) are preferably pumped with the treatment fluid (F) and proppant particles (44) into the fracture network (40) and entrapped within the effective fractures (50) when the formation rock closes under overburden pressure once pumping ceases. Alternately, the Attachment Sites (100) can be pumped into the fractures before or after fracture formation, depending on the formation and environmental conditions. The Attachment Sites (100) can be injected into the formation (14) from the surface or from the wellbore without risk of accidental or premature explosion or reaction since the particles don not contain any explosive or reactive materials. The AS (100) particles can be mixed with the proppant (44) prior to being introduced to the treatment fluid (F) or can be added to the treatment fluid before, after or along with the proppant throughout the fracturing process.

The AS (100) particles are preferably approximately the same size as the proppant particles (44) if they are pumped with the proppant. As mentioned above, the AS particles are specially designed such that each AS particle creates a "docking station" that attracts and attaches to only selected Type-1 and Type-2 particles. The AS particle can be a structural particle, such as a sphere, spherical shell, lattice, latticed particle, segmented particle, or other structural particle providing particle-specific attachment sites. Such a "structural particle" has no part in the process of creating a micro-seismic event. That is, the structural AS particle does not itself react or explode. The attachment mechanism can be based on one or more properties of the functionalized layer. Attachment can be based on one or more mechanical, electrical, magnetic, or chemical processes, or a combination of any of these processes. Structural properties, such as shape, material composition, electrical charge, super-paramagnetic behavior, "tentacles," "sockets," etc., can be used.

Additionally, more than one "species" of Attachment Site particle (100) can be deployed into fracture space such as AS-x (100-$x$), AS-y (100-$y$) and AS-z (100-$z$) as shown in FIG. 3. For example, a plurality of AS particles of species -x (AS-x) (100-$x$) can be pumped into the formation fractures along with a plurality of other species of AS particles, such as AS-y (100-$y$), AS-z (100-$z$), etc. When multiple species of AS particles are present in the fracture space, it is possible to conduct sequential (time-lapse) micro-seismic surveys by deploying and/or activating a first species of energetic particles (e.g., T1-x and T2-x), and at a later time deploying and/or activating another species of energetic particles (e.g., T1-y and T2-y). All of the particles are designed to allow attachment only to the same selected particle species (e.g., T1-x to AS-x, T1-y to AS-y, but not T1-x to AS-y, etc.). In such a manner, multiple micro-seismic surveys are possible at different times deploying only one species of the energetic particles for the first survey and another species of energetic particles for the second survey at a later time.

The Attachment Sites shown in FIGS. 4A through 4F are exemplary embodiments of AS particles according to aspects of the invention. A number of AS particle forms (100, 110, 120, 125, 130, 140) are shown.

An exemplary form of AS particle, seen in FIG. 4A, is a multi-component structure having a solid or hollow "core" section (105), an inner layer (106) and an outer layer (104), a functionalized surface "coating" (102), and a plurality of attachment features (103), such as "sockets" or "ports," or "tentacles" or other extending structures (101). Additional attachment features or attachment properties may be used. The AS particle core section (105) can be solid or hollow and may serve merely for supporting an attachment layer, supplying structural integrity, or storing of functional materials that contribute to "attraction" or "attachment" functionality. For example, the core can include super-paramagnetic particles, magnetic ionic liquids, ferro-fluids, super-capacitors, etc. For protecting the properties of the AS particles while being injected, a protective layer (107) may be incorporated. This protective layer may be designed to decompose, dissolve, decay or otherwise dissipate over time, upon contact with a selected fluid (in situ or introduced), such as a solvent, acid, brine, water, etc., or upon exposure to other environmental parameters, such as temperature, pressure, salinity, pH, etc.

The various surface features described can be created using micro-encapsulation processes and other chemical techniques, as are known in the art, including pan coating, air-suspension coating, centrifugal extrusion, vibration nozzle, spray-drying, ionotropic gelation, coacervation, interfacial polycondensation, interfacial cross-linking, in situ polymerization, matrix polymerization, water beds, etc. One or more shell, membrane or coating layers can be used and the core particles can be hollow, solid, liquid, gel, etc. The shells and layers need not completely surround the core.

Other embodiments of AS particles are seen in FIGS. 4B-F. In FIG. 4B, an AS particle (140) is seen with a functionalized surface layer (142), such as cross-linked fibers, attachment features (143) such as sockets, an outer layer (144) for support and an inner layer (146). In FIG. 4C, an exemplary AS particle (130) has a functionalized surface (132), such as oriented long fibers, attachment features (133), like sockets, an outer layer (134) and an inner layer (136). In FIG. 4D, a hollow AS particle (120) is presented, having a plurality of surface features (123), namely, ports, defined by an outer layer (124) of supporting latticework. Functionalized surface areas (122) can be defined across the latticework. In FIG. 4E, an AS particle (110) is shown having attachment features, such as tentacles (111) and sockets (113), a functionalized surface (112), and an outer layer (114). In FIG. 4F, an exemplary AS particle (125) is seen with a functionalized surface (128) having attachment features, such as tentacles (127) and ports (128) formed by linked molecules or other structures over an outer layer (129).

The AS particles are not reactive to create seismic events, thus providing safe transport, handling, mixing, etc., prior to and during deployment. Preferably, the AS particles do not attach to proppant particles, especially if injected into the fracture space after hydraulic treatment. Some layers (104, 134) are shown on FIG. 4 as completely surrounding the underlying layers (106, 136) or core (105). Other arrangements can be employed, as shown (122, 128), where inner layers are not surrounded by outer layers. Although Attachment Sites shown in FIG. 4B are generally spherical, they may take other shapes, such as ellipsoids, cylinders, or any other 3-dimensional shapes.

Type-1 Particles

Figure 5:
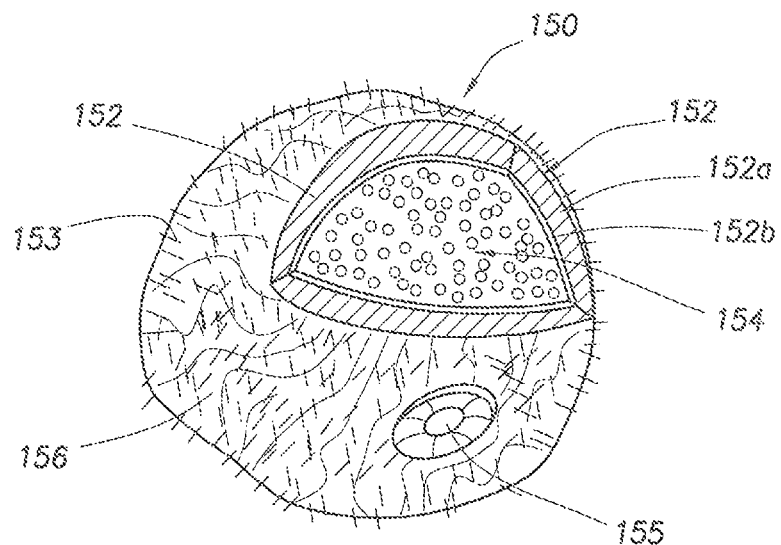
FIG. 5 is a schematic representation of an exemplary embodiment of a Type-1 particle according to an aspect of the invention.

FIG. 5 shows an exemplary embodiment of a Type-1 particle. Type-1 (T1) particles (150) consist of a core section (154) carrying a "payload" of specially designed or selected energetic materials used to create a micro-seismic event. The functionalized surface layer (153), with optional attachment features such as "tentacles" (156) and "sockets" (155), facilitates the attraction and attachment process by providing properties corresponding to those of the AS particles, as described above.

An exemplary shell layer (152), which can be rigid or flexible, provides the support for the outer attachment layer (153) and encapsulates the energetic material of the core (154). In this case, a protective or decay layer is not necessary, as the shell layer (152) provides sufficient stability to reach the attachment site intact. However, such layers may be used. The shell layer (152) can have multiple layers (152a) and (152b).

The T1 particle "payload" of energetic material is contained in the core (154) and is selected to react with a corresponding "payload" of energetic material in a Type-2 particle. Contact or proximity of corresponding Type-1 and Type-2 energetic materials interact to produce a micro-seismic event, such as a detonation, explosion, implosion, exothermic reaction, violent chemical reaction, etc. This process is explained further below. Each Type-1 particle core section carries a "payload" of reactive material for use in creating the micro-seismic event. The concept of payload is familiar to those of skill in the art and can be used to determine the number of Type-1 particles to be injected into the formation, the ratio of Type-1 to Type-2 and AS particles, etc.

When the Type-1 particles are introduced into a fracture network with AS particles present, the shell or attachment layer (153) will attach, mechanically, chemically, etc., to the Attachment Site particles scattered throughout the fracture network. Additional layers or shells can be employed to provide or improve other properties, such as survivability, mobility, flexibility, etc.

The Type-1 particles are preferably of a much smaller size than the proppant or Attachment Site particles. Since the Type-1 particles are preferably introduced into the formation after completion of fracturing, the particles must be able to disperse and move freely in the spaces between the proppant and Attachment Site particles already in place.

As with the Attachment Site particles, multiple species of Type-1 particles can be introduced into the formation fractures. Each species of Type-1 particle, such as Type-1 particle of species -x (150-x), species -y (150-y) and/or species -z (150-z), are selected to attach only to AS particles of the same species. Hence, multiple species of Type-1 particles can be introduced into a fracture and selectively attached to corresponding species of AS particles for the purpose of performing similar surveys at different times.

Type-2 Particles

Figure 6:
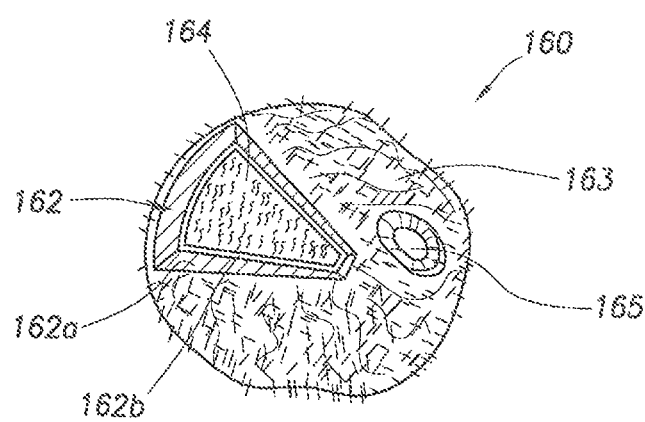
FIG. 6 is a schematic representation of an exemplary embodiment of a Type-2 particle according to an aspect of the invention.

FIG. 6 shows an exemplary Type-2 particle according to an aspect of the invention. Type-2 (T2) particles (160) are similar to Type-1 (T1) particles and preferably consist of a core section (164) carrying specially designed or selected materials which will be used to create a micro-seismic event. That is, the payload of the core section (164) of the Type-2 particles (160) will interact with additional particles, components, or payloads to produce a micro-seismic event such as a detonation, explosion, implosion, chemical reaction, etc. Type-2 particles also preferably have one or more layers or shell sections (162). Preferably the shell sections (162) form a layer or encapsulate the core section (164), thus preventing the core section from reacting, etc., before planned. The shell sections (162) are specifically designed or selected to attach to a corresponding Attachment Site particle (100). When the Type-2 particles (160) are introduced into the fracture space, the functionalized surface layer (163) section causes attraction or attachment to Attachment Site particles scattered throughout the fracture network. Attachment features (165), such as sockets, can be employed as well. The various layers, such as shell (162), can themselves have multiple layers The protective and decay layers may not be necessary where the layer of the core section provide the structural stability necessary to reach an attachment site, the reactivity to react with corresponding particles upon a triggering event, and the structure, chemistry or characteristic to attach as required.

The Type-2 (160) particles are preferably much smaller than the proppant particles and Attachment Site particles. Since the Type-2 particles are preferably introduced into the formation after completion of fracturing, the particles must be able to disperse and move freely in the spaces defined between the proppant and Attachment Site particles. The Type-1 and Type-2 particles can be of similar or dissimilar size. In a preferred embodiment, the Type-2 particles are smaller than the Type-1 particles, which are, in turn, smaller than the AS particles. While the various particles (proppant, Attachment Site, and Type-1 and Type-2), are shown as spherical for ease of illustration, it is understood that other shapes can be employed with or without the surface features mentioned elsewhere herein, and that the selection of shape may be used to allow, disallow, enhance or reduce attachment of selected particles to one another. Additional layers or shells can be employed, such as decay layers as described elsewhere herein.

As with the Attachment Site and Type-1 particles, multiple species of Type-2 particles can be introduced into the formation fractures. Each species of Type-2 particle, such as Type-2 particles (160-x), (160-y) and (160-z), are selected to attach only to AS particles and/or Type-1 particles of the same species. Hence, multiple species of Type-2 particles can be introduced into a fracture and selectively attach to corresponding species of AS or Type-1 particles.

Figure 7:
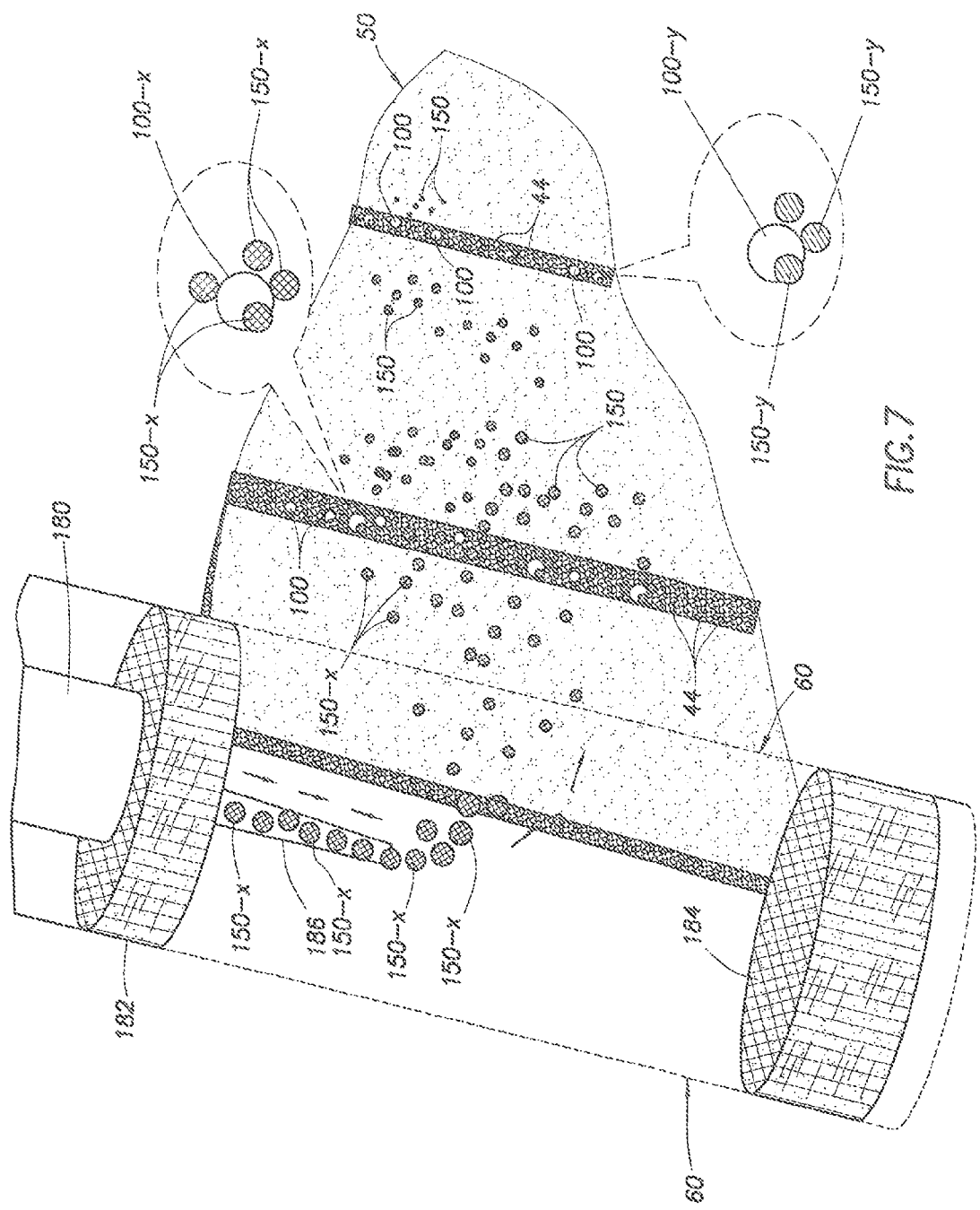
FIG. 7 is a schematic representation of injection of Type-1 particles into a simple fracture according to an aspect of the invention.

FIG. 7 is a schematic representation of a plurality of Type-1 particles being introduced into a propped fracture space. As in FIG. 2, presented is a graphic representation of a simple fracture model having a simple bi-wing propped fracture (50) (one wing shown) extending into a formation zone (14). The wellbore (60) is representative of a wellbore from which fracturing fluid (F) is introduced into the formation. Proppant particles (44) are pumped into the fractures. After pumping of the fracturing fluid (F) ceases, the exemplary fracture (40) closes or seals to form an effective fracture (50). The AS particles (100) are pumped or introduced into the formation either along with the proppant or separately. The Type-1 particles (150) are shown being introduced into the formation using a particle release or injection apparatus (180), here bracketed by upper and lower packers or other sealing mechanisms (182, 184), sealing a section of the wellbore for injecting the formation. Alternately, Type-1 particles can be introduced concurrent with the proppant particles and/or AS particles. Multiple species of Type-1 particles, such as T1-x (150-x), T1-y (150-y), etc., can be injected for the purpose of performing similar surveys at different times.

The insets show a plurality of Type-1 particles of species -x (150-x) attached to an AS particle of the same species (100-x) and a plurality of Type-1 particles of species -y (150-y) attached to an AS particle of the same species (100-y) for the purpose of performing similar surveys at different times.

Figure 8A:
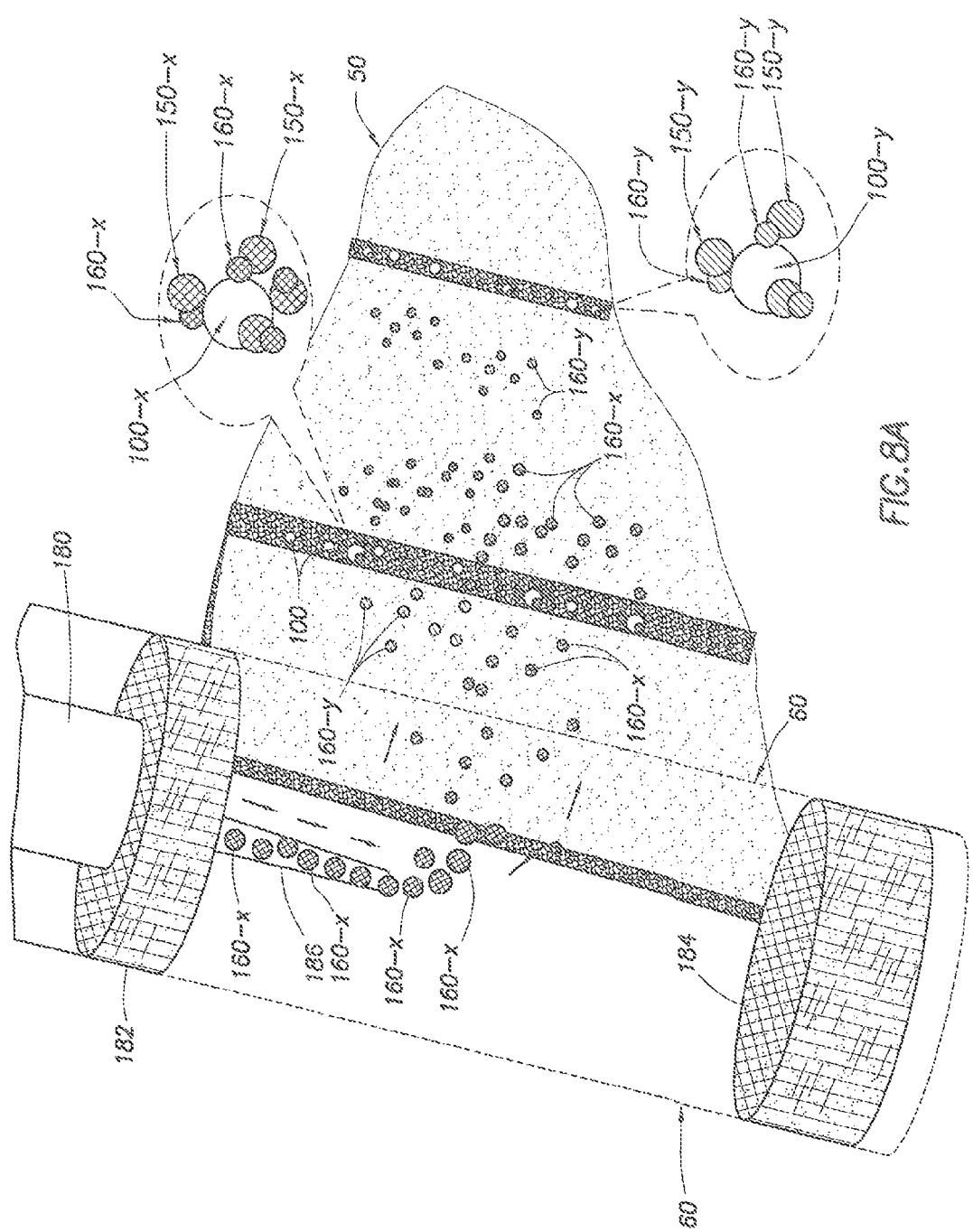
FIG. 8A is a schematic representation of injection of Type-2 particles into a simple fracture according to an aspect of the invention.

FIG. 8A is a schematic representation of a plurality of Type-2 particles (160) being introduced into a propped fracture space (50). A simple bi-wing fracture (50) extends into a formation zone (14). As explained above and shown on FIG. 8A, Type-2 particles may be injected into the fracture space following the injection of Type-1 particles. Here Type-2 particles (160) are shown being introduced into the formation using a particle release or injection mechanism (180), bracketed by upper and lower packers or other sealing mechanisms (182, 184), sealing a section of the wellbore. The delivery tool (180) injects Type-2 (160) particles into the formation, such as through nozzle (186). Alternately, Type-2 particles can be introduced concurrent with the proppant particles and/or AS particles. The insets show multiple Type-2 particles of species (160-$x$, 160-$y$) attached to AS particles of matching species (100-$x$, 100-$y$) and/or to Type-1 particles of similar species (150-$x$, 150-$y$). One or more Type-2 (160) particles can attach to a single AS (100) particle. As explained elsewhere, the AS particles may be merely structural or can be comprised of one or more chemical. As also explained elsewhere, the Type-1 and Type-2 particles can have core and shell sections, as desired, to facilitate attachment and to isolate core sections. The insets are enlarged detail schematics of exemplary AS particles (100-$x$, 100-$y$) with attached Type-1 particles (150-$x$, 150-$y$) and Type-2 particles (160-$x$, 160-$y$).

FIG. 8B is a schematic representation of a preferred method according to an aspect of the invention where the sequence of events following the attachment of Type-2 particles to Type-1 and/or Attachment Sites are shown as depicted by letters A through F. The first species of AS particles (100-$x$) with attached corresponding first species Type-1 and Type-2 particles (150-$x$) and (160-$x$) are in place in the propped fracture space (50). A chemical or explosive reaction starts when Type-1 and Type-2 particles (150-$x$) and (160-$x$) are attached to an AS particle and/or proximate or in contact with each other. The shells containing the core payloads of Type-1 and Type-2 particles begin to coalesce. Protective shells, when present, are dissipated, by heat, time, pressure, chemical, c., as explained above, so the payload materials can interact. When the payloads of Type-1 and Type-2 particles (150-$x$) and (160-$x$) come into contact, or effective proximity, an energetic reaction initiates, thereby creating a micro-seismic event. Such events occur at all Attachment Sites having sufficient Type-1 and Type-2 particles attached. A single reaction can trigger reactions in local particle clusters.

The reaction (170) caused by the mixing of Type-1 and Type-2 particle payloads may be a chemical exothermic reaction, a low or high order detonation, deflagration, or combustion in a confined environment under elevated pressure and temperature as dictated by the reservoir formation environment and the materials used in the Type-1 and Type-2 payloads. Following the reaction (170), a micro-seismic event (16) occurs which as described elsewhere herein causes waves (18) to radiate from the event site and travel through the subterranean formations. The waves are detected by sensors, such as sensor (21), for example, positioned in the wellbore. Other sensors positioned in monitoring wells (22), the surface (24), or in shallow surface wells (26), also receive the waves, which are detected and recorded as wave data (172) at recording stations (25). Micro-seismic events (16) occur at a plurality of AS particle locations spread across the effective fracture space (50), providing enough micro-seismic events to provide accurate and detailed mapping or surveying of the effective fracture space.

Also seen in FIG. 8B are additional species (-$y$, -$z$) of AS particles (100-$y$, 100-$z$). One or more of the species of Type-1 and/or Type-2 particles can be introduced to the fracture space concurrently or at spaced apart times. The use of particle species allows for multiple mapping surveys to be performed. Where an initial survey is run using species-x, the AS-y and AS-z particles remain intact. A later survey, using the remaining species of AS particles, can be performed later, either by injecting Type-1 and/or Type-2 particles of the remaining species, or by "triggering" (by heat, pressure, time, chemical, etc.) such particles which were previously pumped into position.

The "time-lapse" mapping concept allows the operator to further manage reservoir production and planning by observing changes over extended periods of reservoir life. For example, a survey using the first species of particles can be performed after a fracturing operation has been completed, but before production has started, to map the propped fractures. A second survey, using another species of particles, may be performed after a selected period (hours, days, months) of production to map the effective fracture space at that time. Another survey can be conducted after a longer production period with yet another species of particles.

The surveys should preferably be performed when the "noise" generated by unrelated events are minimized to improve signal to noise ratio, thereby improving quality and accuracy of the mapping.

Particle Size and Concentration

Current technology is capable of detecting micro-seismic events which cause pressure changes of as little as tens of psi. Future technology may push that limit of detectability further to lower pressure amplitude pulses. For reference, a measurable micro-seismic event may be equivalent to an event caused by detonation of approximately 1 milligram of common explosive, such as TNT. For comparison, a typical perforation shaped charge is about 10-40 grams of explosives and may cause pressure waves of millions of psi. The goal is to select and operate particle agglomerations which create measurable micro-seismic events from distances (event to sensor) of 30-1500 feet. But the event should also be small enough to meet safety concerns.

The proppant particles are sized by "mesh size" typically. The mesh size of the proppant will generally determine the size of AS and Type-1 or Type-2 particles which can effectively be used. In a preferred embodiment, the AS particles are approximately the same size as the proppant particles. Similarly-sized AS particles can be easily mixed with and dispersed in the proppant. Larger or smaller AS particle sizes may also be used. Particles which are injected or released to the fracture space after the fractures have closed, such as Type-1 and/or Type-2 particles, are preferably considerably smaller than proppant or AS particles so they can effectively flow through the porous space formed by the trapped proppant particles in the fracture space. As an example, a typical Type-1 and/or Type-2 particle may be between $1/14$th and $1/318$th the size of an AS or proppant particle. Such a size allows the particles to flow through the proppant and allows multiple particles to attach to one or more AS particles. These approximate figures are based on spherical geometries; therefore other sizes may be desirable to accommodate non-spherical particle geometry.

The concept of Attachment Sites allows the micro-seismic event density, that is, the number of micro-seismic events generated (and measured) per unit volume of fracture space, to be selected during the design phase of the survey. Similarly, the ratios and amounts of the Type-1 and/or Type-2 particles can be selected based on payload, attachment mechanism, volume of disbursement, density of AS particles, etc. for each individual survey depending on the reservoir properties, environmental conditions and a number of other variables As an example, for a micro-seismic survey where 1 mm size proppant and the same size AS particles are used, if the desired survey of micro-seismic events is about one per square meter of fracture space, then the required AS concentration would be approximately 1 AS particle per 1 million proppant particle for every mm of fracture width. Hence, if the estimated eventual fracture width is calculated to be approximately 3 mm, then the AS to proppant ratio should be targeted at about 3-5 AS particles per 1 million proppant particles, allowing for non-uniform distribution and other losses. In practice this results in a very workable amount of AS particles for such a survey. Assuming similar bulk densities for proppant and AS particles, the above example requires 3-5 pounds of AS particles per million pounds of proppant. Preferably a much higher number of Type-1 and/or Type-2 particles are injected to insure sufficient numbers reach and attach to the AS particles, provide sufficient payload at any given attachment site to ensure a measurable micro-seismic event, etc.

Triggering Events

Triggering events cause initiation of the micro-seismic events. In a preferred embodiment, after the AS, Type-1 and/or Type-2 particles are in position, dispersed at locations throughout the fracture space, the reactive particles are triggered by a triggering event to initiate micro-seismic events at each location. The triggering event can include multiple stages, such as a decay stage for removing decay layers from the particles. The decay stage can, for example, include methods such as injecting a fluid (brine, acid, chemical wash, etc.) into the formation to dissolve or otherwise remove any decay layers. Alternately, the decay stage can employ a change in an environmental condition such as temperature, pressure, salinity, pH, etc. For example, high salinity water can be injected to dissolve one or more decay layers on one or more particles, thereby triggering a reaction between the now-exposed core sections of the Type-1 and Type-2 particles. Alternately, the triggering event can simply be a time delay during which the protective shells dissipate and/or coalesce allowing the reactive payloads to come into contact and/or to mix with each other thereby initiating a reaction.

The core sections of the Type-1 and Type-2 particles carry payloads of explosive or reactive material (or initiating, catalytic materials, etc.) which, upon contact with the other core section material(s), cause the explosion, reaction, etc.

Where multiple species of AS, Type-1 and Type-2 particles are employed, various triggering events may be selected to start successive series of micro-seismic events for each species type. It is also possible to release Type-2 particles which simply react immediately upon contact with the Type-1 particles. The micro-seismic events would then occur as the Type-2 particles are injected and progress through the fracture space and become attached to type-1 particles of the same species.

Particle Injection/Release Apparatus

Figure 9:
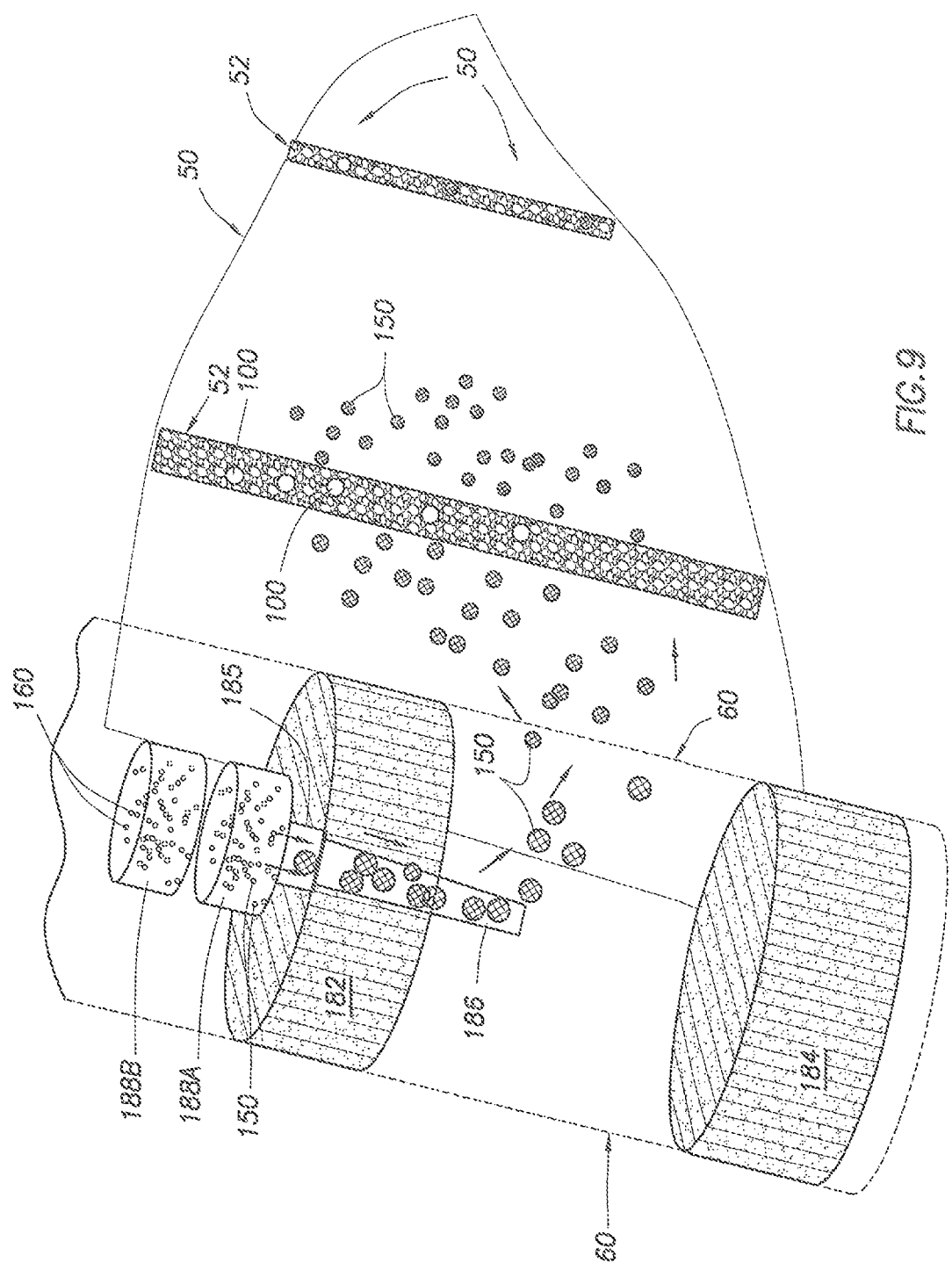
FIG. 9 is a schematic of an exemplary injection tool for injecting particles into the formation according to an aspect of the invention.

FIG. 9 is a schematic of an exemplary particle injection and release tool (180) and method according to one aspect of the invention. An upper sealing assembly (182) and a lower sealing assembly (184), such as packers, are positioned in the wellbore (60) above and below a zone of the fracture space (50) targeted for injection of Type-1 and/or Type-2 particles. The upper sealing assembly (182) can surround the release tool or a portion thereof, such as delivery nozzle (186). The injection apparatus (180) can be lowered in to the well on the completion tubing string, coiled tubing, slick line or wire line. The apparatus (180) has an injection pump (185) and several chambers (188-A, 188-B, etc.) for different types of particles and fluids. The adjustable pressure and output rate pump (185) and the nozzle (186) push the contents of a selected chamber into the fracture space. The particles are delivered in a suitable fluid. In a preferred embodiment, where multiple Types or species of particles are to be injected, the separate particle types or species are contained in separate chambers (188-A) and (188-B) of the tool and are injected separately and sequentially. The injection system (internal piping, pump and nozzle) is flushed with a suitable type of fluid before and after each injection where the particle type is changed, as desired. An actuator (185) for injecting the particles is known in the art, including a submersible pumps, hydraulic or electric actuators, a DPU, etc.

Advancements over prior art included in the inventive methods are injection or introduction of the reactive particles after conclusion of fracturing and/or without mixing of the particles at the surface or in the wellbore above the formation. Further, the reactive or energetic particles are not then prone to accumulating in unwanted areas, such as in a mixer, at the surface, along the wellbore, etc.

Other release mechanisms may be employed. For example, the AS particles may also be injected or pumped into the formation using a downhole tool after completion of fracturing processes. However, this would necessitate the use of AS particles of much smaller size, to flow through the proppant particles, which would compromise their effectiveness as attachment sites, especially where designed to attract and attach to multiple reactive particles.

First Method Flow Diagram

Figure 10:
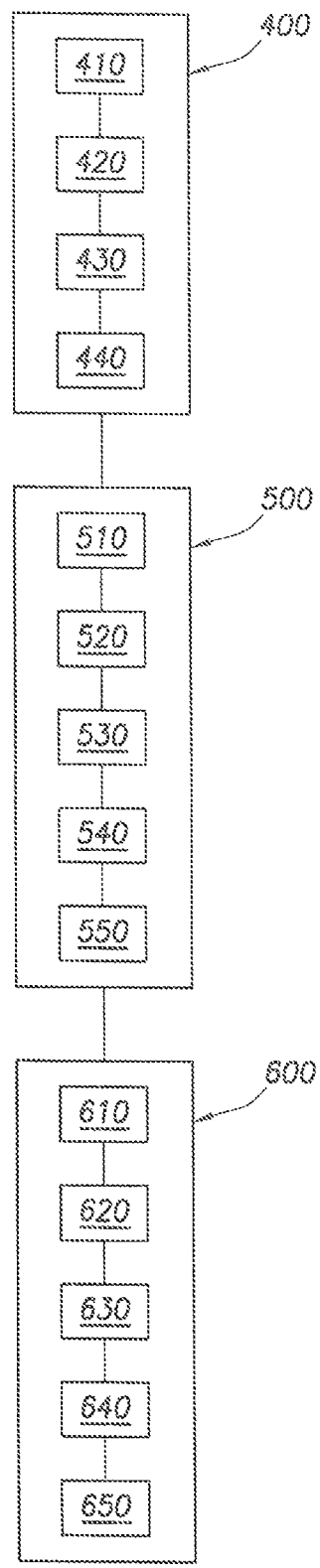
FIG. 10 exemplary flow diagram indicating various steps of preferred methods according to aspects of the invention is a schematic of an exemplary particle release tool and method according to an aspect of the invention.

FIG. 10 is an exemplary flow diagram indicating various steps of preferred method according to aspects of the invention as explained above. The flow diagram applies to a first method. For other methods, not all of the steps must be performed, nor must they be performed in the order presented. Variations are presented and discussed herein and will be recognized and understood by those of skill in the art. In FIG. 10, the process is shown divided into three stages (400), (500) and (600) indicating "fracturing," "surveying," and "data processing" stages, respectively. The fracturing fluid is pumped into the target zone of the formation, into existing fractures and creating additional fractures at (420). The fracturing fluid contains or delivers proppant particles to prop open the fractures. Also At (420), Attachment Sites (AS particles) are injected into the fractures mixed with the proppant. Multiple species of AS particles may be utilized, but for this discussion it is assumed that only two species, AS-x and AS-z are used. At (430), pumping operations are ceased. At this stage, open fractures typically close, except where the proppant and AS particles have been placed in the fracture space. Next there may be a "clean-out" stage (440) during which well is allowed to flow-back, to clean the fracturing fluids from the reservoir formations. At (510), a particle injection or release tool is deployed adjacent the zone of interest and one of the two species, for example Type-1, species-x, particles are injected into the zone. The T1-x particles travel in the fracture space and attach to AS-x particles. At (520), Type-2, species-x, particles are injected into the zone and attach to either the AS-x or T1-x particles, or both. At (530), a first triggering event occurs, allowing or causing contact between the reactive materials in the T1-x and T2-x particles at each attachment site. At step (550), a set of micro-seismic events occur, caused by the reactions of payload materials, causing seismic waves to travel in all directions throughout the formations. At (610) the micro-seismic events (or the waves thereof) are detected by sensors. Various stages of data processing follows, such as recording, transfer, filtering, clean-up, quality-check, etc., at (620). Other steps can include preliminary field processing at (630), transfer to data processing centers at (640) and final processing and output for fracture mapping at (650).

All or part of the surveying (500) and data processing (600) stages may be repeated at a later time using additional species (T1-z and T2-z), to provide a second fracture mapping survey, allowing a "time-lapse" capability.

Other Methods

Additional methods are presented for producing a plurality of micro-seismic events in a fractured formation. The following methods described are derived from the previously described method and details will not be repeated. Details of the primary method are applicable to the following methods, with exceptions and differences indicated below.

Method 2:

Another preferred method does not employ Attachment Site particles. In other words, no AS particles are positioned within the effective fracture space. Type-1 particles are injected or introduced into the propped fracture space after fracturing has ceased. Multiple species of Type-1 particle may be introduced. The Type-1 particles may have the structures (core, layers, etc.) and chemistry as discussed elsewhere herein. Preferably the Type-1 particles have a reactive material core section and an attachment layer for attaching Type-2 particles.

After dispersal of the Type-1 particles within the propped fracture space, a first species of Type-2 particles are introduced into the fracture space. Type-2 particles preferably have a core section specifically designed or selected to initiate a reaction with corresponding Type-1 particle cores. One or more layers of the Type-2 particles facilitate attachment to the Type-1 particles.

Multiple species of Type-2 particles may be used for multiple surveys as described above. The various species can be introduced to the fracture network simultaneously and triggered by separate triggering events, or can be introduced sequentially after triggering of previously introduced species.

Method 3:

In another embodiment, Attachment Site particles and Type-1 particles are incorporated. These particles can be described as "modified" Type-1 particles that have many of the characteristics of the above-described AS particles. For example, the modified T1 particles can be larger, stronger, or use attachment features such as latticework, ports, etc. In this method, modified Type-1 particles are mixed with proppant and pumped into the fracture space. When pumping ceases, the particles are entrapped within the fracture network. The modified Type-1 particles are exposed to high pressures and fracture fluid chemistry during pumping and entrapment and it is expected that many of them may not survive. This disadvantage may be compensated for by increasing the concentration of modified Type-1 particles within the proppant. Multiple species of modified Type-1 particle may be introduced. It should be noted that the payload of the modified Type-1 particle does not present a hazard during the pumping stage as it contains only one of the components required for the energetic reaction. After a suitable period of time has passed to allow for optional clean-up, etc., the first species of Type-2 particles are introduced into the fracture network. Type-2 particles preferably have cores of specifically designed or selected materials that initiate reactions with corresponding Type-1 particles. One or more layers of the Type-2 particles facilitate attachment to the Type-1 particles. Multiple species of Type-2 particles may be used for multiple surveys as described above. Multiple species may be introduced to the fracture network simultaneously or sequentially and react upon separate triggering events.

Figure 11A:
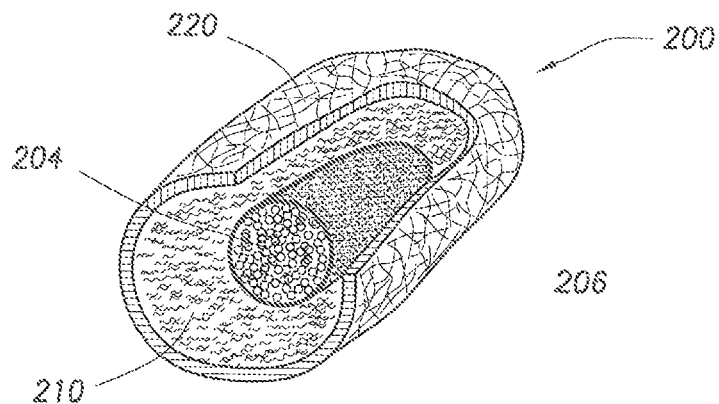
FIGS. 11A-B are schematic views of exemplary Type-3 particles according to an aspect of the invention.

Method 4:

FIG. 11A is a schematic view of an exemplary Type-3 particle for use with Attachment Sites according to an aspect of the invention. The Type-3 particle (200) incorporates the materials required for an energetic reaction in its inner core (204) and outer core (210) sections, and separated by a partition (206). The outer shell (216) and functionalized surface (220) may incorporate surface features such as sockets, ports, or tentacles (221, 222, 223). Type-3 particles may be thought of as an agglomeration of the characteristics of Type-1 and Type-2 particles.

According to an exemplary method, Attachment Sites (AS) of several species are pumped with the fracturing fluid into the fracture network and entrapped. As described herein, the AS particles are suitable proppant size particles that have specially designed outer shells such that each AS creates a "docking station" that attracts and accepts only a specific "species" of Type-3 particles. Type-3 particles are then introduced into the fracture space. Type-3 particles (200) have an inner core section (204) which carries a payload of selected materials that react with the payload materials contained in outer core (210). A separation layer or capsule (206) separates the inner and outer core sections. The partition (206) can be triggered to allow contact between the payloads, such as by means of changes in environmental conditions (e.g., temperature, pressure, etc.) or by time decay, etc., as discussed above. The partition (206) can be a membrane, coating, layer or multiple such mechanisms. An outer shell (220) consists of one or more layers of selected materials to isolate the outer core materials from the environment until an appropriate triggering event. The selectivity of Type-3 particles based on the "species" concept described above can apply as well.

Figure 11B:
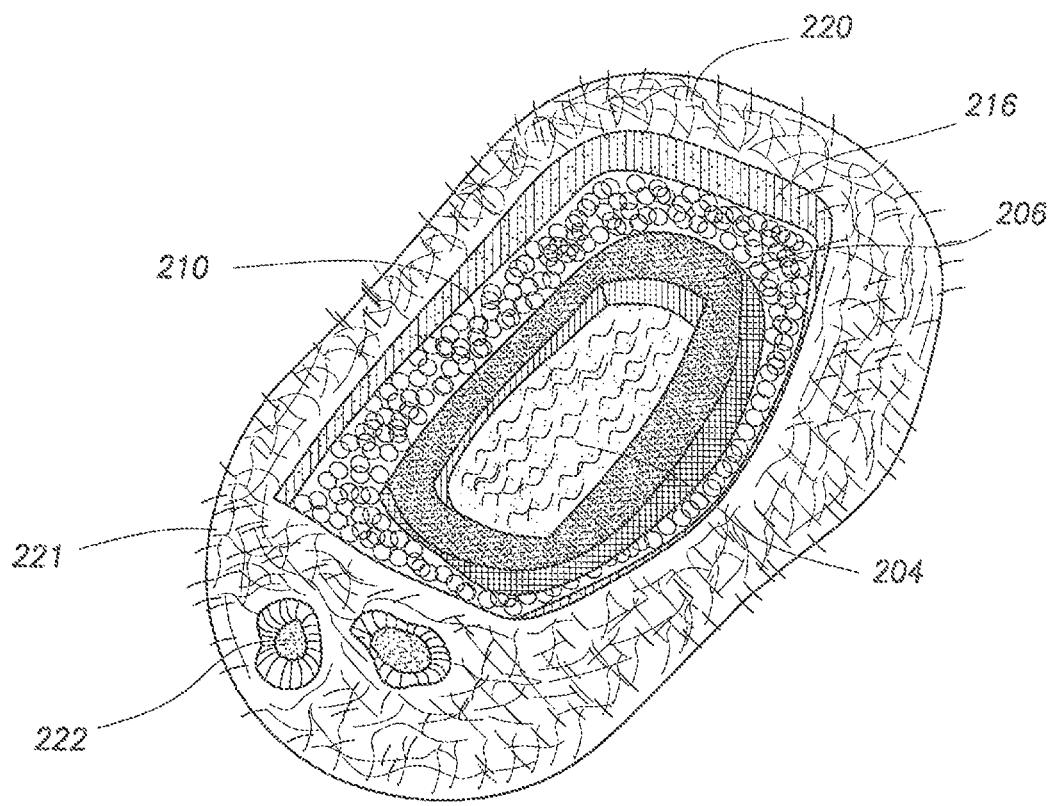

FIG. 11B shows an alternative embodiment of Type-3 particle for use with Attachment Site particles. Similar parts are numbered and not discussed. Additional attachment features (222) are present. Additional layer (216) can provide a protective coating, a time-delay coating, etc.

Figure 12:
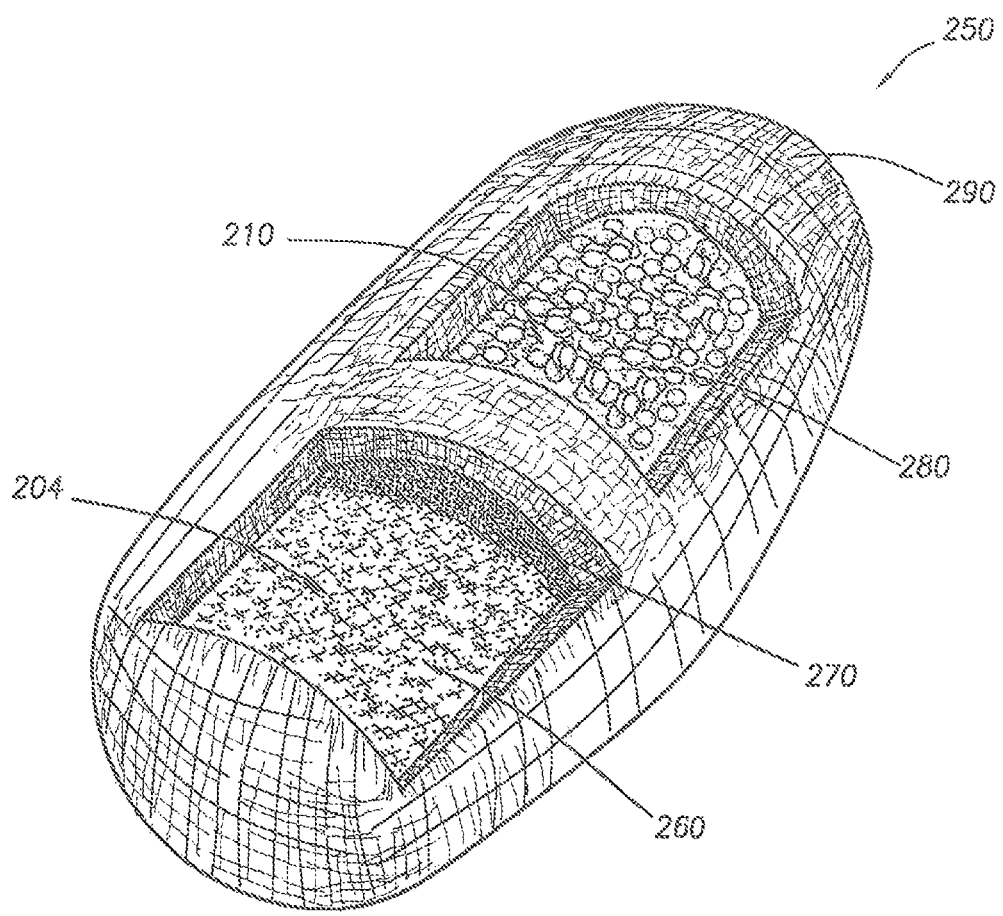
FIG. 12 is an schematic view of an exemplary particle Type-3A according to an aspect of the invention.

Method 5:

FIG. 12 is a schematic illustration of an embodiment of a Type-3 particle for use without Attachment Sites. The Type-3 particles (250) are preferably injected after fracturing processes have ended. After a suitable period of time has passed, to allow for optional clean-up, etc., a first species of Type-3 particle is introduced. The Type-3A particle may have two compartments (260) and (280) for the payload materials (204) and (210) separated by one or more partitions (270). The compartments (260, 280) carry the payload of materials that initiate a reaction as described above. The partition (270) separating the compartments can be triggered to bring into contact the contents of the compartments, such as by means of changes in environmental conditions, time decay, etc. The partition can be a membrane, coating, layer or multiple such mechanisms. When the partition (270) has been removed, deactivated, dissipated, etc., by the triggering event, the payloads create a reaction producing a micro-seismic event. An outer shell (290) consists of one or more layers of selected materials to isolate the compartments (260, 280) from the environment until an appropriate triggering event. The surface functionality of the modified Type-3 particle used for this method does not incorporate attachment features. The modified Type-3 particles are able to freely travel though the proppant particles without accumulating at docking sites.

General Specifications

Attachment sites (docking stations), Type-1, Type-2 and Type-3 particles can be of any suitable size and shape to fit the fracture space and to contain required amounts of materials.

The outer layer (shell, capsule or coating) design of the Attachment Sites, Type-1, Type-2 and Type-3 particles determine the unique species of the particles in such a way that only the same species of components attach to each other. By this concept of distinct and separate species of particles, it is possible that the system may be operated selectively, as and when needed, by later introducing or triggering different species of particles (assuming this species of the Attachment Sites were entrapped within the fracture space).

The outer layer section of Type-1, Type-2 and Type-3 particles can be sufficiently elastic to enable the particles to deform without structural damage to pass through restrictions.

The preferred methods, where only the Attachment Sites are pumped with the proppant during the fracturing process, have distinct advantages, such as preventing premature exposure of the energetic payloads to harsh conditions or chemicals present in treatment fluids.

The methods are capable of selectively activating varying amplitude (strength) seismic events at controlled times by using the delivery devices and methods explained herein.

The release mechanism design for T1, T2, and T3 particles allows selective surveys within fracture networks created by multi-stage hydraulic stimulation jobs.

The system allows "Time-lapse" surveys to be performed as and when required.

Overview of Method

Figure 13:
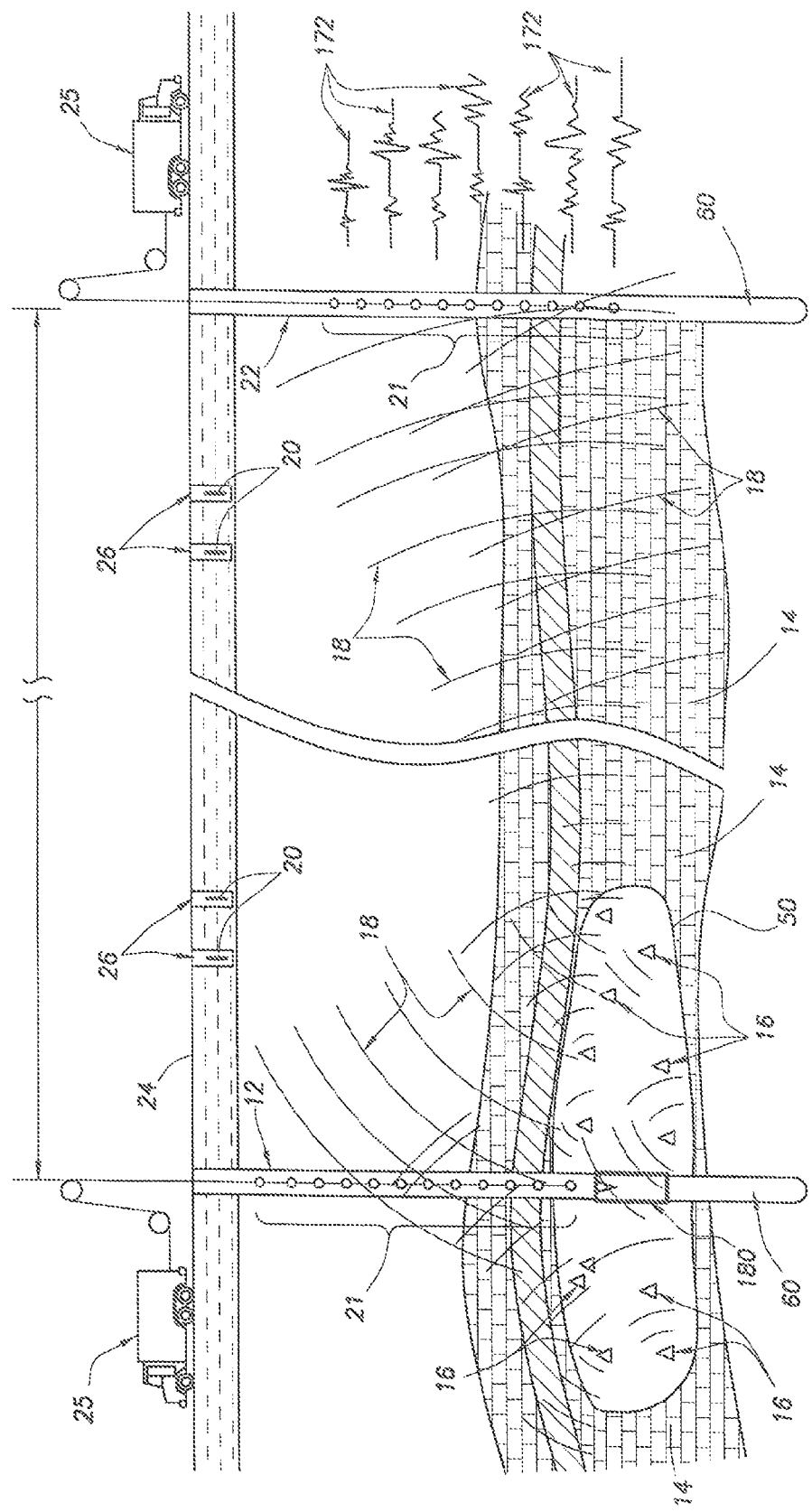
FIG. 13 is a schematic illustration of treatment and monitoring wells with arrayed sensors for detection and recording micro-seismic events caused during hydraulic fracturing according to a method of the invention.

FIG. 13 is a schematic illustration of treatment and monitoring wells with arrayed sensors for detection and recording micro-seismic events caused during hydraulic fracturing according to a method of the invention. An effective fracture (50) has been formed in treatment well (12) in formation (14). Micro-seismic events (16) are caused according to the methods described herein. The micro-seismic events generate seismic waves (18). The waves (18) propagate away from each micro-seismic event (16) in all directions and travel through the reservoir formation. The waves are detected by a plurality of seismic sensors, such as seen at (20) and (21). The seismic sensors can be placed in a wellbore of one or more observation or monitoring wells (22). Sensors can also be placed at or near the surface (24), preferably in shallow boreholes (26) drilled for that purpose. Sensors (20) and (21) detect P- and S-wave data (172) from micro-seismic events (16). The data is typically transferred to data processing systems (25) for preliminary well site analysis. In-depth analysis is typically performed after the raw data is collected and quality-checked. After final analysis, the results (maps of the fracture networks) are invaluable in development planning for the reservoir and field, and in designing future hydraulic fracturing jobs.

Coating (Neutral) Materials

The particle shells, layers or coatings are preferably made of one or more of the following chemicals in the following Groups, alone or in combination, and may be cross-linked at any percentage by any number of means known in the art, in single or multiple layers over a particle core section or sections. Exemplary shell, capsule or coating materials include:

materials containing hydrocarbons in acid or salt form, with or without monomers or polymers, such as, Alkenes, Polyethylene, Polypropylene, Polycarbonates, Polycondensates, Benzene derivatives, Styrene, Polystyrene, Alkene derivatives (Vinyl Groups and Vinyl Polymers), Polyvinyl nitriles, Polyvinyl alcohols, Polyvinyl ketones, Polyvinyl ethers, Polyvinyl thioethers, Polyvinyl halides materials containing oxygen in acid or salt form, with or without monomers or polymers, such as, Acrylic Acid, Methacrylic Acid, Itaconic Acid, Oxalic Acid, Maleic Acid, Fumaric Acid, Phthalic Acid, Carbolic Acid (Phenol), Fatty acids, Malonic Acid, Succinic Acid, 2-acryloyloxyethylsuccinic acid, 2-acryloyloxyethylphthalic acid, 2-methacryloyloxyethylsuccinic acid, 2-methacryloyloxyethylphthalic acid, Polycarboxylic acid, Polyacrylic acid, Polymethacrylic acid, Epoxides, Ethylene oxide, propylene oxide, Esters, Methyl acrylate, Ethyl acrylate, Methyl methacrylate, Polymethyl methacrylate, Polyethylene glycol, Polypropylene glycol, Polytetramethylene glycol, Polytetramethylene ether glycol, Polyether ketones, Polyesters, Polyarylates, Polycarbonates, Polyalkyds, Aldehydes, Formaldehyde, Acetaldehyde, phenol formaldehyde resins, Carbohydrates, Polysaccharide containing amine groups, Peroxides, Sodium peroxydisulfate, and Potassium peroxydiphosphate materials containing Sulphur in acid or salt form, with or without monomers or polymers, such as, Sulfonic Acids, 2-Acrylamido-2-methyl-1-propanesulfonic Acid (AMPS), Poly 2-acrylamido-2-methyl-1-propanesulfonic acid (PAMPS), 4-Styrenesulfonic acid, Vinyl sulfonic acid, styrene sulfonic acid, butylacrylamide sulfonic acid, alkyl or aryl sulfonic acids, methacryl sulfonic acid, 2,3,4-Acryloyloxyethane sulfonic acid, 2,3,4-Methacryloyloxyethane sulfonic acid, Polystyrene sulfonic acid, Polyvinyl sulfonic acid, Sulfones, Dimethyl sulfate, Sodium polystyrene sulfonate, Sodium styrene sulfonate, Alkyl sulfonates, Polysulfones, Polyarylsulfones, Polyethersulfones, Polysulfonates, Polysulfonamides, Sulfides, Polysulfides, Polyphenylene sulfide, sulfoethyl acrylate, sulfoethyl methacrylate, sulfopropyl acrylate, sulfopropyl methacrylate, sulfoaryl acrylate, and sulfoaryl methacrylate materials containing Phosphorus and Fluorine in acid or salt form, with or without monomers or polymers, such as, Phosphate, Trimethyl phosphate, Phosphoric acid, Polyphosphazenes, Fluorinated ethylene propylene, Polytetrafluoroethylene, perfluoroalkoxy polymer resin, Ammonium salts, Alkaline or Alkali Metal Salts of Sulfate or Phosphate)

materials containing Nitrogen in acid or salt form, with or without monomers or polymers, such as, Amines, Primary, secondary, tertiary fatty amines, Hexanediamine, Polyamines, Ethylenediamine, Diethylenetriamine, Triethylenetetramine, Polyalkylamines, Amides, Dimethylformamide, Acrylamide, Polyamides, Polyphtalamide, Imines, Aziridine, Polyethylene imine, Imides, Polyimides, Polyetherimides, Polyamide-imides, Alkyl amines, Ethanolamine, methylamine, Cyclic amines, Aziridine, Ployethylene amine, Aromatic amines, Aniline, Polyaniline, Cyanates, Isocyanates, Methyl cyanate, Methyl isocyanate, Resins, Polyaramides, Polyamidemides, Hydrazine derivatives, monomethyl-hydrazine, dimethyl-hydrazine materials containing Thermoplastics and other Polymers, such as, Polymaleicanhydride octadecene, Polybenzoxazoles, Polybenzimidazoles, Polyureas, Polyurathanes, Polysilazanes, and Polysiloxanes Reactive Materials The particle core sections of energetic or reactive materials, are made of one or more of the following chemicals, alone or in combination, and may be combined at any percentage by any number of means known in the art, in any total weight to achieve a sufficient specific energy to generate the required micro-seismic event strength. Exemplary core and payload materials include:

high-order explosives such as Pentaerythritoltetranitrate (PETN), Hexamethylenetetraminemononitrate, Cyclotrimethylenetrinitramine (RDX), Cyclotetramethylenetrinitramine (HMX), Hexanitrohexaazaisowurtzitane (HNIW), Hexanitrosilbene (HNS), Picrylamino-3,5-dinitropyridine (PYX), Diazodinitrophenol (DDNP), Lead Azide, Silver Azide, Hydrazine Azide, Trinitrotoluoene (TNT), Polyazapolycyclic caged Polynitramines (CL-20), 2,4,6-Trinitrophenylmethylnitramine (Tetryl)

energetic plasticizers such as Nitroglycerine (NG), Ethyleneglycoldinitrate (EGDN), Acetone Peroxide, bis (2,2 di-nitropropyl) acetal/formal (BDNPA/BDNPF), Triethylene glycol-dinitrate (TEGDN), Diethylene glycol-dinitrate (DEGDN), Trimethylolethane Trinitrate (TMETN), 1,2,4-Butanetrioltrinitrate (BTTN), Nitratoethyl nitramine (NENA)

plasticizers such as dioctyladipate (DOA), isodecyl perlargonate (IDP) bis(2-ethylhexyl) sebacate, dioctyl maleate (DOM), dioctyl phthalate (DOP), polyisobutylene, plasticizing oil)

oxidizers such as Ammonium Nitrate (AN), hydroxylammonium Nitrate (HAN), Ammonium dinitramide (AND), Potassium Nitrate, Barium Nitrate, Sodium Nitrate, Ammonium Perchlorate, Potassium Perchlorate, Sodium Perchlorate, Lead Nitrate, Anhydrous Hydrazine, Hydrazinium Nitrate, Nitro-methane, Nitro-ethane, Nitro-propane)

sensitizers such as Diethylamine, Triethylamine, Ethanolamine, Ethylendiamine, Morpholine, Nitromethane)

reactive metal powders such as Aluminum, Magnesium, Boron, Titanium, Zirconium hydrocarbon fuels such as diesel, kerosene, gasoline, fuel-oil, motor-oil energetic binders such as polyglycidyl-nitrate (PGN), polyglycidyl-azide (GAP), polynitratomethyl methyl-oxetane (NMMO), poly(3,3 bis(azidomethyl)oxetane (BAMO), poly(nitramino-methyl-methyl-oxetane (NAMMO), 1,3,3-trinitroazetidine (TNAZ)

binders such as Polybutadiene prepolymers, polypropylene glycol (PPG), polyethylene glycol (PEG), polyesters, polyacrylates, polymethacrylates, ethylenevynil acetate other materials such as micro particles of resins, Polymeric foam, Polyurethane rubber, Stearic Acid, Carbon Powder, Silica, and tagging agents, such as, 2,3-dimethyl-2,3-dinitrobutane (DMDNB, DMNB)

Additional Methods

Figure 14:
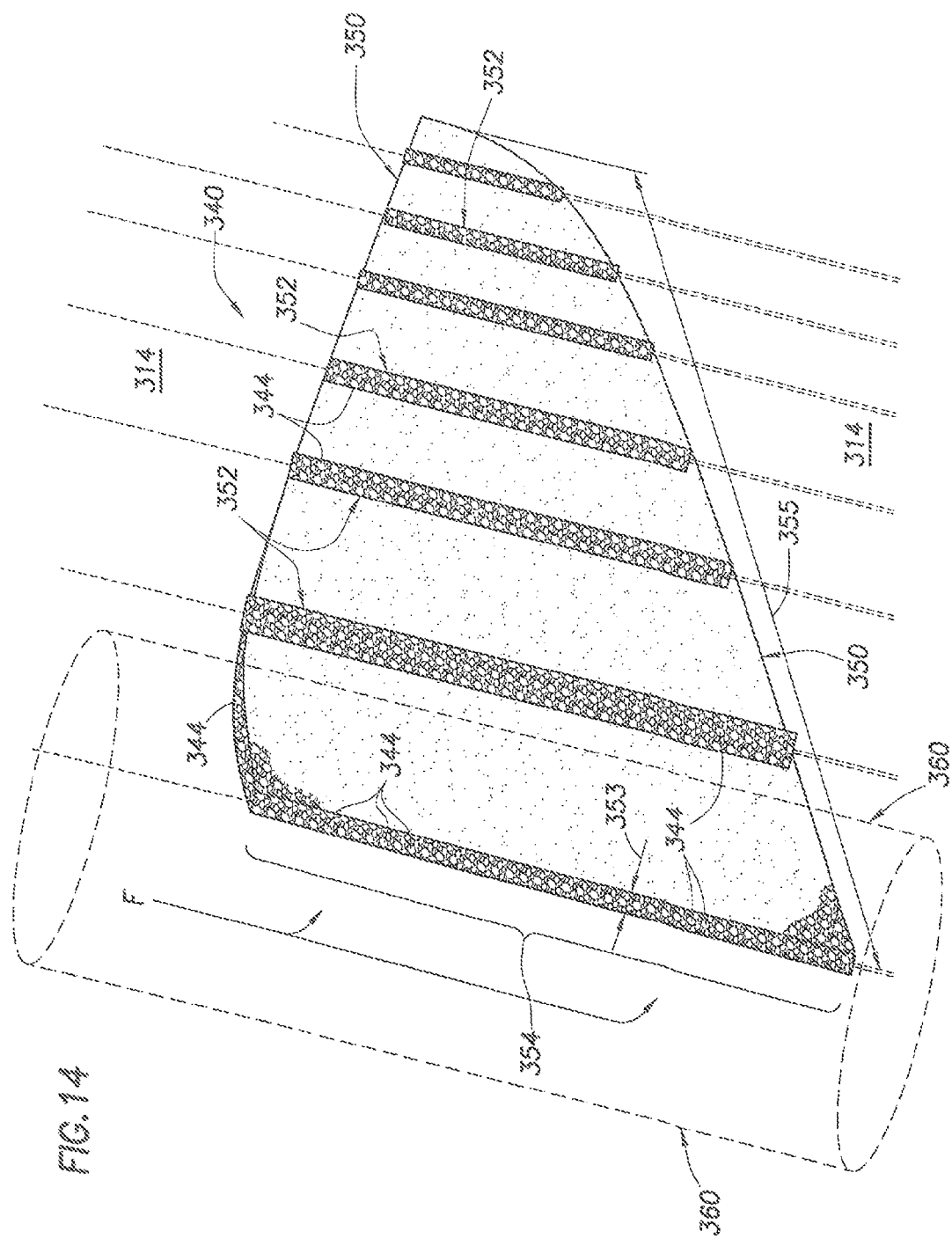
FIG. 14 is a graphical representation of a simple fracture model.

FIG. 14 is a graphical representation of a simple fracture model. A simple bi-wing fracture plane (340) (only one wing shown) extends into a reservoir formation (314). A wellbore (360) (cased or uncased) is representative of the wellbore through which the fracturing fluid (F) is introduced into the zone, i.e. the "treatment well." The fracturing process results in formation of fractures which are initially propagated along planes, the orientation of which are dictated by the in situ stress profile of the formation (314). Typically, the planes radiate from the wellbore (360). Proppant particles (344) are pumped into the fractures along with the fracturing fluid. After pumping of the fluid (F) ceases, the fracture closes or seals to an effective fracture (350), indicated graphically in cross-sections (352). A typical fracture has a much greater length (355) than width (353) and can vary in height (354). These dimensions may become critical parameters for selecting size and amounts of proppant, particles and fluid injected into the formation, design of a fracturing plan, etc.

Figure 15:
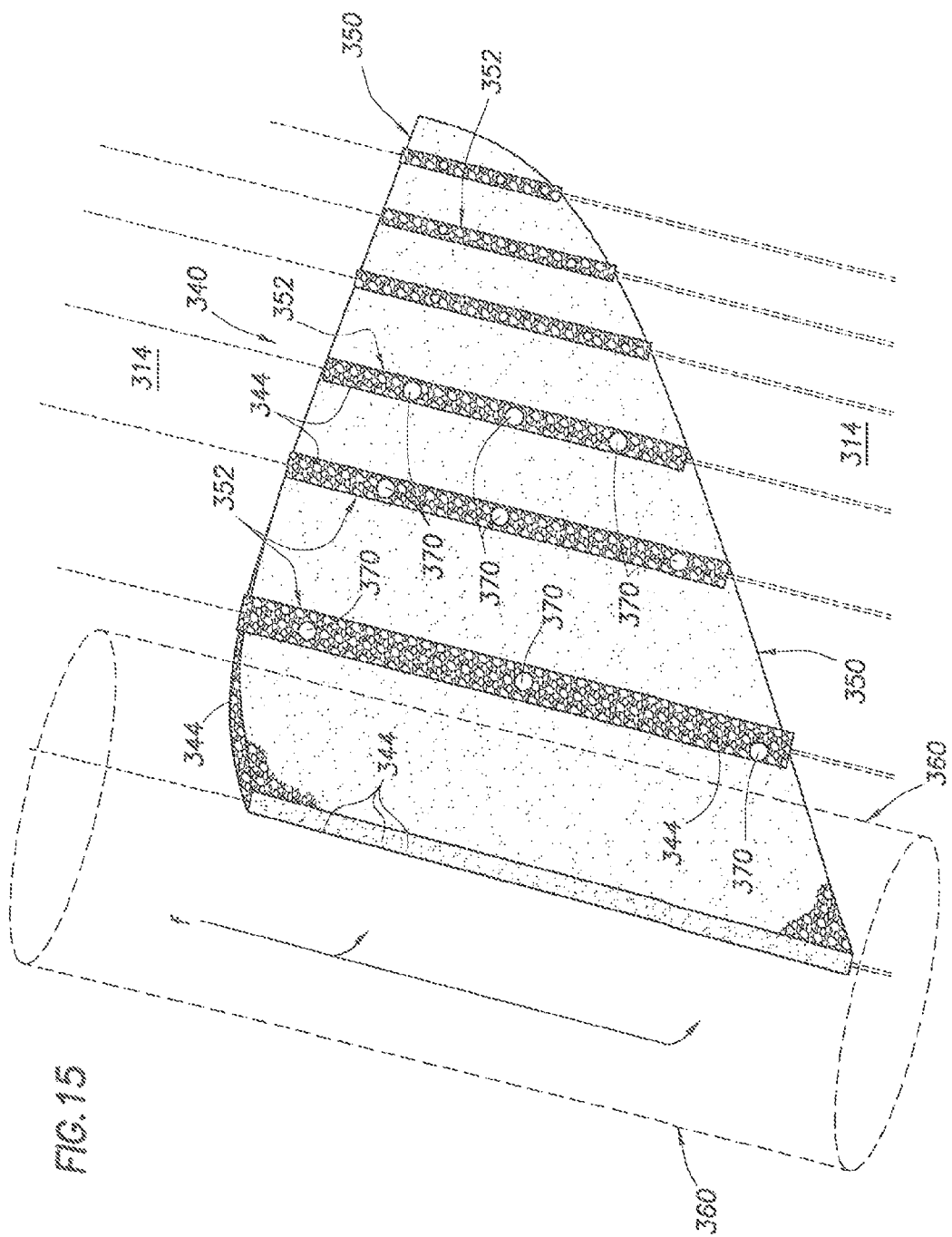
FIG. 15 is a graphical representation of propped fracture model having treated proppant particles, preferably injected by pumping fracturing fluid into the formation, along with treated, reactive proppant particles according to an aspect of the invention.

FIG. 15 is a graphical representation of propped fracture model having proppant particles (344), preferably injected by pumping fracturing fluid (f) into the formation, along with treated, reactive proppant particles (370). As used herein, "injection" and related terms are used to include injection, pumping in fluids, and other methods of introducing fluids, slurries, gels, and solid-bearing fluids into a zone of a formation using methods known in the art. The term is used generically and includes introduction of such fluids, etc., into the zone of the formation from a downhole tool positioned adjacent the zone. The non-reactive, untreated proppant particles (344) can be any type of proppant particle known, or which may become known, in the art and will not be discussed in detail herein.

Figure 16:
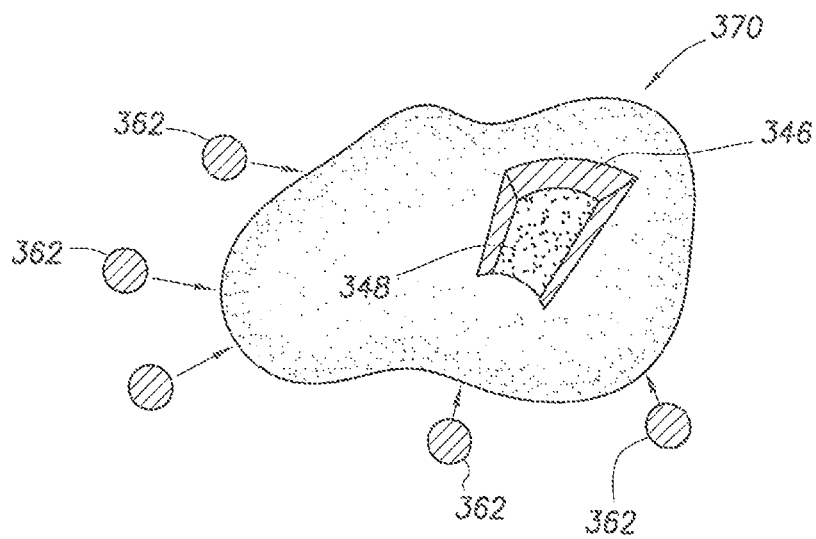
FIG. 16 shows an exemplary treated proppant particle, having a coating over a proppant particle, and exemplary reactive particles according to an aspect of the invention.

FIG. 16 shows an exemplary treated proppant particle (370), having a coating (346) over a proppant particle (348), and exemplary reactive particles (362). The proppant particle (348) can be any proppant particle known in the art which is compatible with the coating and reactions described herein. For example, the proppant particle can be of various shape, geometry, and size, have various structural features, be made of various materials, have various properties, etc., to provide the desired propping function of the proppant. Proppant is known in the art by practitioners of ordinary skill and will not be discussed in detail herein. The proppant particle (348) to which the coating is applied can be identical to the un-treated proppant particles (344) used in the process. Delivery, mixing, and types of fracturing fluid are well known in the art and will not be discussed in detail herein. The proppant particles (344) and (370) can be delivered to the formation by any known or discovered means. In a preferred embodiment, the treated and untreated proppant are of similar size. The particles in the figures are not to scale for simplicity and purposes of discussion. In one embodiment, the proppant particles (348) to be treated are smaller than the untreated particles (344) such that, after coating, the treated and untreated proppant is approximately the same size.

An exemplary coating (346) can be rigid or flexible, can fully or partially cover the proppant particle (348), can be fully or partially depleted upon reaction with reactive particles (362), and can be used in conjunction with the various protective or delay coatings and layers discussed elsewhere herein. In the preferred embodiment, no protective or decay layer is necessary, as the coating provides sufficient physical stability to reach the fractures intact.

The coating is designed to react with reactive particles (362), producing micro-seismic events. The reactive particles (362) are preferably smaller than the un-treated proppant particles (344) and treated proppant particles (370). The reactive particles (362) are shown as solid or semi-solid masses in the figures, however, it is to be understood that this is merely a representation and is not limiting as to the form, substance, properties, materials, or state of matter of the reactive particles. For example, the reactive particles (362) can be solids suspended in fracturing fluid, gel, etc., dissolved chemical compounds in the fracturing fluid, placed in treatment fluids ahead of or behind the primary treatment.

Generally, the coating of the treated proppant chemically reacts with reactive particles (362). The coating (346) of the treated proppant can be said to carry a "payload" of energetic material and is selected to react with a corresponding "payload" of energetic material in one or more reactive particles. Contact of corresponding energetic materials cause an interaction producing a micro-seismic event, such as a detonation, explosion, implosion, exothermic reaction, violent chemical reaction, etc. The concept of "payload" is familiar to those of skill in the art and can be used to determine the number, weight, volume, or other measure of coating, treated proppant, untreated proppant, and reactive particles to be injected into the formation, and the relative ratios thereof. The reactive particles are preferably much smaller than the proppant and coated proppant to enhance their ability to disperse and move freely in the spaces between the proppant particles.

The coating can be applied to the proppant particle by any known methods, including micro-encapsulation, pan coating, air-suspension coating, centrifugal extrusion, vibration nozzle, spray-drying, ionotropic gelation, coacervation, interfacial polycondensation, interfacial cross-linking, in situ polymerization, water beds, etc.

The treated and untreated proppant particles (344) and (370) can be mixed at the surface, during insertion into the wellbore, at a downhole location within the wellbore, or in the formation. Where the reactive particles and treated proppant is mixed or otherwise combined at the surface or during injection, it is expected that reactions may well occur prior to injection into the formation fractures. In such a case, the reactions are designed to produce micro-seismic events at such a small scale that no damage is done to the well, wellbore, tools. Similarly, the reactions must be controlled to protect personnel. Where the treated proppant (370) includes additional layers, coatings, materials, etc., to delay any reaction, there may still be some reactions which occur prior to injection into the formation. In such instances, the reactions are designed to be of such small magnitude as to not cause harm. Alternately, these issues can be mitigated or avoided by introducing the reactive particles to the wellbore or formation generally after injection of the proppant particles.

In a preferred embodiment, the coating (346) can be designed to "crack," thereby exposing the coating to potential reaction, under the increased pressure on the particles caused when the fractures "relax" or close upon cessation of pumping of fracturing fluids, or when the fracturing gel, slurry, etc., liquefies or disperses. In another embodiment, the micro-seismic events can occur upon precipitation of reactive particles from the fracturing fluid.

In other embodiments, catalysts and/or inhibitors can be used in conjunction with the reactive particles to control timing of the reactions. Such catalysts and inhibitors can be present in the fracturing fluid, later-added, or injected prior to injection of the reactive particles. Such catalysts and inhibitors could be the product of a secondary chemical reaction that occurs within the fracturing fluid. The reactions of the coating of the treated proppant and the reactive particles is similar to that described elsewhere in this specification and will not be repeated here.

For the embodiments and methods described wherein a reactive coating of a treated proppant particle interacts to create a micro-seismic event with one or more reactive particles, the materials listed in the following Groups, alone or in combination, in single or multiple layers, in combination with binding or other materials, in various phases, mixtures, suspensions, etc. can be used, or are expected to operate, as reactive coating materials and/or reactive particle materials:

high-order explosives such as Pentaerythritoltetranitrate (PETN), Hexamethylenetetraminemononitrate, Cyclotrimethylenetrinitramine (RDX), Cyclotetramethylenetrinitramine (HMX), Hexanitrohexaazaisowurtzitane (HNIW), Hexanitrosilbene (HNS), Picrylamino-3,5-dinitropyridine (PYX), Diazodinitrophenol (DDNP), Lead Azide, Silver Azide, Hydrazine Azide, Trinitrotoluoene (TNT), Polyazapolycyclic caged Polynitramines (CL-20), 2,4,6-Trinitrophenylmethylnitramine (Tetryl)

energetic plasticizers such as Nitroglycerine (NG), Ethyleneglycoldinitrate (EGDN), Acetone Peroxide, bis (2,2 di-nitropropyl) acetal/formal (BDNPA/BDNPF), Triethylene glycol-dinitrate (TEGDN), Diethylene glycol-dinitrate (DEGDN), Trimethylolethane Trinitrate (TMETN), 1,2,4-Butanetrioltrinitrate (BTTN), Nitratoethyl nitramine (NENA)

plasticizers such as dioctyladipate (DOA), isodecyl perlargonate (IDP) bis(2-ethylhexyl) sebacate, dioctyl maleate (DOM), dioctyl phthalate (DOP), polyisobutylene, plasticizing oil)

oxidizers such as Ammonium Nitrate (AN), hydroxylammonium Nitrate (HAN), Ammonium dinitramide (AND), Potassium Nitrate, Barium Nitrate, Sodium Nitrate, Ammonium Perchlorate, Potassium Perchlorate, Sodium Perchlorate, Lead Nitrate, Anhydrous Hydrazine, Hydrazinium Nitrate, Nitro-methane, Nitro-ethane, Nitro-propane)

sensitizers such as Diethylamine, Triethylamine, Ethanolamine, Ethylendiamine, Morpholine, Nitromethane)

reactive metal powders such as Aluminum, Magnesium, Boron, Titanium, Zirconium hydrocarbon fuels such as diesel, kerosene, gasoline, fuel-oil, motor-oil energetic binders such as polyglycidyl-nitrate (PGN), polyglycidyl-azide (GAP), polynitratomethyl methyloxetane (NMMO), poly(3,3 bis(azidomethyl)oxetane (BAMO), poly(nitramino-methyl-methyl-oxetane (NAMMO), 1,3,3-trinitroazetidine (TNAZ)

binders such as Polybutadiene prepolymers, polypropylene glycol (PPG), polyethylene glycol (PEG), polyesters, polyacrylates, polymethacrylates, ethylenevynil acetate other materials such as micro particles of resins, Polymeric foam, Polyurethane rubber, Stearic Acid, Carbon Powder, Silica, and tagging agents, such as, 2,3-dimethyl-2,3-dinitrobutane (DMDNB, DMNB)

Figure 18:
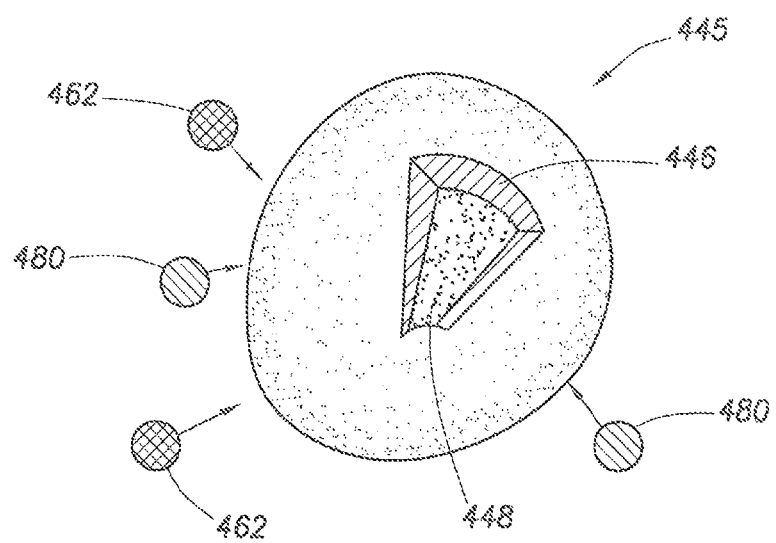
FIG. 18 shows an exemplary coated reactive particle, having a coating over a reactive core according to an aspect of the invention.
Figure 17:
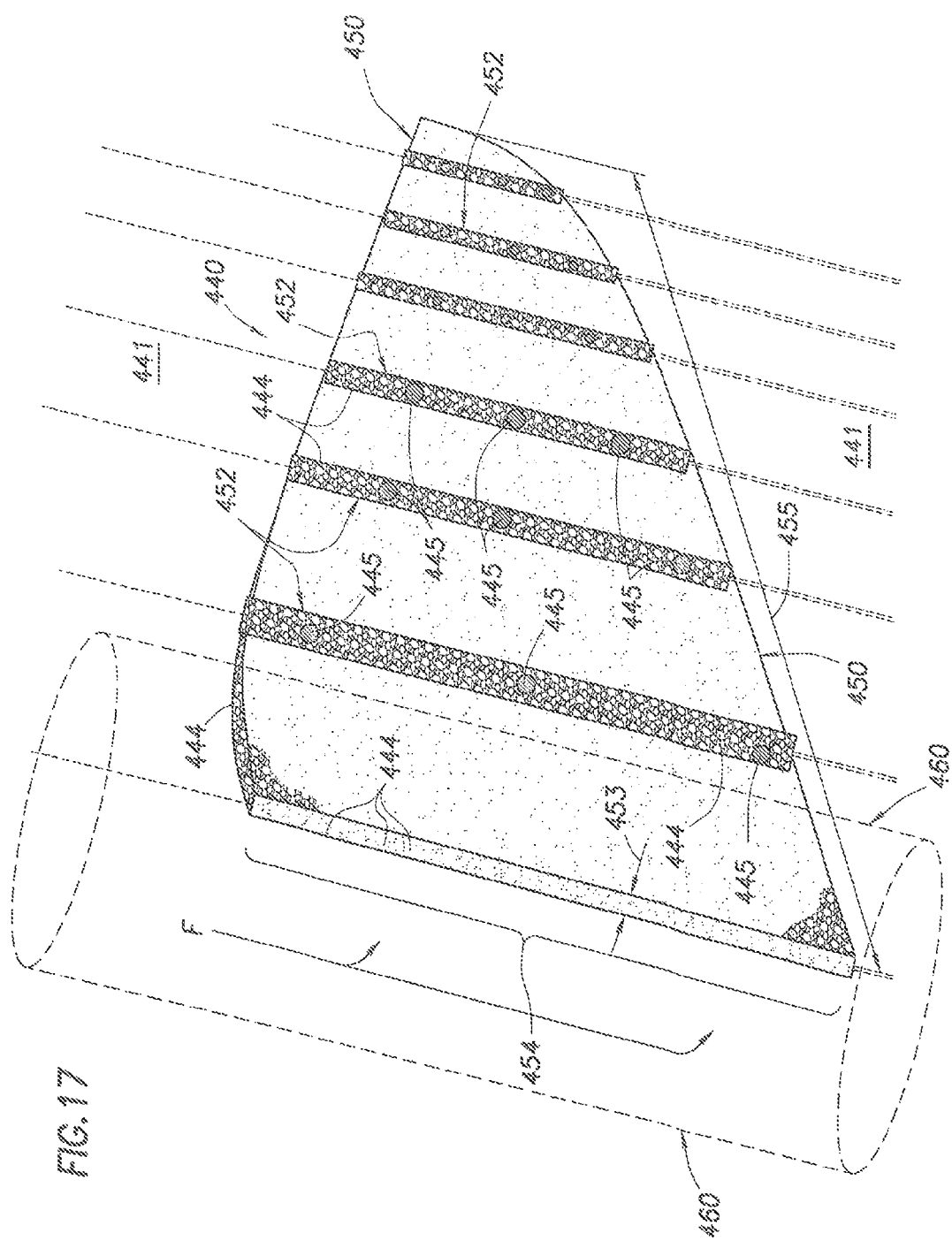
FIG. 17 is a graphical representation of a simple fracture model having coated reactive particles positioned within the fracture according to an aspect of the invention.

Another embodiment and method are presented with respect to FIGS. 17-18. FIG. 17 is a graphical representation of a simple fracture model (441). A simple bi-wing fracture plane (440) (only one wing shown) extends into a reservoir formation. A wellbore (460) (cased or uncased) is representative of the wellbore through which the fracturing fluid (F) is introduced into the zone, i.e. the "treatment well." The fracturing process results in formation of fractures which are initially propagated along planes, the orientation of which are dictated by the in situ stress profile of the formation. Typically, the planes radiate from the wellbore (460).

Proppant particles (444) are pumped into the fractures along with the fracturing fluid. The non-reactive proppant particles (444) can be any type of proppant particle known, or which may become known, in the art and will not be discussed in detail herein. After pumping of the fluid (F) ceases, the fracture closes or seals to an effective fracture (450), indicated graphically in cross-sections (452). A typical fracture has a much greater length (455) than width (453) and can vary in height (454). These dimensions may become critical parameters for selecting size and amounts of proppant, particles and fluid injected into the formation, design of a fracturing plan, etc.

Also seen in FIG. 17, positioned in the propped fractures, is a plurality of coated reactive particles (445). The coated reactive particles are preferably injected by pumping of fracturing fluid into the formation concurrently with the injection of the proppant. However, although not anticipated as a common embodiment, coated reactive particles (445) can be injected after the proppant. Methods of injection are described elsewhere herein.

FIG. 18 shows an exemplary coated reactive particle (445), having a coating (446) over a reactive core (448). The coated reactive particles (445) consist of a core section (448) of reactive materials used to create a micro-seismic event. The "payload" of the core section (448) of the coated reactive particles interacts with one or more triggering particles (462) to produce a micro-seismic event such as a detonation, explosion, implosion, chemical reaction, etc.

The coated reactive particles (445) have one or more coatings (446). The coatings encapsulate, preferably completely, the core section and prevent premature reaction. The coating is selected to delay or control timing of the interaction between the core reactive material and the triggering particles. The coating is removable, such as by dissolution, reaction, decomposition, dissipation, melting, chemical stimulus including pH and salinity, etc., in response to the effect of one or more triggering particles.

FIG. 18 also shows, in representative form, an exemplary removal particle (480) selected to remove the coating from the coated, reactive particles (445). The removal particle or component is shown as solid for discussion purposes, but can be any phase, dissolved or suspended in a fluid, etc. The removal particles are selected to remove the coating (446) from the coated reactive particles (445), and can be, for example, a selected fluid (in situ or introduced), such as a solvent, acid, brine, water, diesel, etc. The removal particles can be chemical compounds, a chemical wash, brine, etc., naturally occurring in the formation or introduced. Preferably, the removal particles or components are in situ and do not require further activity by the user, however, the removal particles can be added by the user and injected into the well, either before, during, or after injection of the coated reactive particles (445). A coating can be rigid or flexible, fully or partially cover the reactive particle, fully or partially removed upon removal, and used in conjunction with additional coatings as discussed elsewhere herein.

The removal particles (480) can be injected in a carrier fluid, such as water, brine, diesel, or fracturing fluid, and can act to remove the coating only in the presence of a catalyst, if desired. The carrier fluid can also be used to inject triggering particles (462) into the formation. The carrier fluid can transport one or both of the removal and triggering particles.

FIG. 18 also shows, in representative form, an exemplary triggering particle (462) or component. The triggering particles initiate the micro-seismic events by reaction with the reactive core (448) of the coated reactive particles (445). In a preferred embodiment, after removal of sufficient coating (446) by removal particles (480), the reactive cores (448) of the dispersed coated particles (445), are triggered by one or more triggering particles (462) to initiate micro-seismic events at each location. As with the removal particles, the triggering particles are shown as solid in the Figures for discussion purposes, but may be of any phase, dissolved, suspended, or otherwise carried in a fluid, present naturally in the formation or introduced by the user, etc. Further, the triggering particles can be introduced to the fractures before, during or after introduction of the coated reactive particles (445) and before, concurrently with, or after introduction of the removal particles (480). The triggering particles can cause the micro-seismic event as a participant in a chemical reaction, a catalyst to a reaction, etc.

In a preferred embodiment, a single type of selected particle can perform both the functions of removal of the coating on the reactive particle and triggering of the reactive particle. That is, a single fluid or material both removes the coating and reacts with the reactive material of the reactive particle. In another embodiment, a carrier fluid, such as brine, removes the coating while a dissolved or suspended material in the brine triggers the reaction. The reaction of reactive particles and triggering particles is similar to that described elsewhere in this specification. Further, the use of catalysts, inhibitors, etc., is discussed elsewhere herein and not repeated here.

Delivery, mixing, and types of fracturing, treatment, and well fluids are well known in the art and will not be discussed in detail herein. The proppant (444), coated reactive particles (445), removal particles (480), and triggering particles (462) can be delivered to the formation by known means.

The materials available for use as removable (non-reactive) coatings, removal particles, reactive materials, triggering materials, etc., are discussed and listed elsewhere herein and will not be repeated here in the interest of brevity. Those of skill in the art will recognize those materials which are appropriate for use in the various embodiments described immediately above. The reactive materials listed above can be used in or to create the reactive core and/or reactive particles. Potential removable coating materials, and removal particles and methods are discussed above herein.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A method for mapping of fractures within a hydrocarbon bearing zone of a subterranean formation, the zone having a wellbore extending therethrough, the method comprising the steps of:
   injecting a plurality of reactive particles, each having a reactive core and a non-reactive coating, into fractures in the zone of the formation;
   removing at least a portion of the non-reactive coating of the plurality of reactive particles by interaction with a plurality of removal particles;
   triggering a plurality of reactions of the reactive cores of the reactive particles;
   creating a plurality of micro-seismic events in response to the plurality of reactions
   detecting at least one of the micro-seismic events; and
   determining a distribution, dimension, or geometry of propped hydraulically-induced fractures and fracture networks from at least one of the micro-seismic events.

2. The method of claim 1, wherein the step of triggering further comprises the step of triggering a plurality of reactions utilizing in situ materials, chemicals, fluid, or compounds found in the formation.

3. The method of claim 1, further comprising the step of injecting a plurality of triggering particles into the formation.

4. The method of claim 3, wherein the reactive cores and the triggering particles contain materials including at least one detonating compound and at least one explosive compound.

5. The method of claim 3, wherein the plurality of removal particles and the plurality of triggering particles are both comprised of the same particles.

6. The method of claim 1, wherein the step of removing further comprises removing at least a portion of the non-reactive coatings utilizing in situ formation fluids, materials, chemicals or compounds.

7. The method of claim 1, wherein the step of removing further comprises dissolving the non-reactive coatings of the reactive particles.

8. The method of claim 1, wherein the reactions cause explosions, implosions, exothermic reactions or combustions.

9. The method of claim 1, wherein the steps of removing non-reactive coatings and triggering reactions is accomplished using the same substance.

* * * * *